United States Patent
Ha et al.

(10) Patent No.: US 12,503,716 B2
(45) Date of Patent: Dec. 23, 2025

(54) PROMOTER AND METHOD OF PRODUCING GLUTATHIONE USING THE SAME

(71) Applicant: CJ CHEILJEDANG CORPORATION, Seoul (KR)

(72) Inventors: Cheol Woong Ha, Seoul (KR); Yeong Eun Im, Seoul (KR); Eun Bin Yang, Seoul (KR); Yeonsoo Kim, Seoul (KR); Hyung Joon Kim, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 750 days.

(21) Appl. No.: 17/790,619

(22) PCT Filed: Apr. 2, 2021

(86) PCT No.: PCT/KR2021/004115
§ 371 (c)(1),
(2) Date: Jul. 1, 2022

(87) PCT Pub. No.: WO2021/201643
PCT Pub. Date: Oct. 7, 2021

(65) Prior Publication Data
US 2023/0056278 A1  Feb. 23, 2023

(30) Foreign Application Priority Data
Apr. 3, 2020 (KR) .................. 10-2020-0041184

(51) Int. Cl.
*C12N 15/81* (2006.01)
*C12N 9/00* (2006.01)
*C12P 21/02* (2006.01)

(52) U.S. Cl.
CPC ............... *C12P 21/02* (2013.01); *C12N 9/93* (2013.01); *C12N 15/81* (2013.01); *C12Y 603/02002* (2013.01); *C12N 2800/102* (2013.01)

(58) Field of Classification Search
CPC .......... C12N 9/93; C12N 15/81; C12P 21/02; C12Y 603/02002
See application file for complete search history.

(56) References Cited

FOREIGN PATENT DOCUMENTS

KR  10-2014-0135622 A  11/2014

OTHER PUBLICATIONS

Pinel et al., "Deconstructing the genetic basis of spent sulphite liquor tolerance using deep sequencing of genome-shuffled yeast," Biotechnology for Biofuels, 8: 1-16 (2015).
Office Action dated Jun. 6, 2023, issued in corresponding Japanese Patent Application No. 2022-529822 .
Biot-Pelletier et al., "Seamless site-directed mutagenesis of the *Saccharomyces cerevisiae* genome using CRISPR-Cas9," Journal of Biological Engineering, 10: 6 (2016).
NCBI, GenBank accession No. CP048991.1 (Feb. 26, 2020).
Fan et al., "Increasing glutathione formation by functional expression of the γ-glutamylcysteine synthetase gene in *Saccharomyces cerevisiae*," Biotechnology Letters, 26: 415-417 (2004).
Wu et al., "GSH1, Which Encodes y-Glutamylcysteine Synthetase, Is a Target Gene for yAP-1 Transcriptional Regulation," Molecular and Cellular Biology, 14 (9): 5832-5839 (1994).
Sipes, "The role of glutathione in the toxicity of xenobiotic compounds: metabolic activation of 1,2-dibromoethane by glutathione," Advances in Experimental Medicine and Biology, 197: 457-467 (1986).
International Search Report issued in corresponding International Patent Application No. PCT/KR2021/004115 dated Jul. 20, 2021.

*Primary Examiner* — Maryam Monshipouri
(74) *Attorney, Agent, or Firm* — Morgan, Lewis & Bockius LLP

(57) ABSTRACT

Provided are a novel promoter, a vector including the same, a microorganism including the same, and a method of producing glutathione using the same.

11 Claims, No Drawings
Specification includes a Sequence Listing.

SEQUENCE LISTING

```
<160> NUMBER OF SEQ ID NOS: 41

<210> SEQ ID NO 1
<211> LENGTH: 499
<212> TYPE: DNA
<213> ORGANISM: Unknown
<220> FEATURE:
<223> OTHER INFORMATION: Saccharomyces cerevisiae CEN.PK-1D

<400> SEQUENCE: 1
ctcttgaatg gcgacagcct attgccccag tgttccctca acaaccttgg tagttggagc      60
gcaattagcg tatcctgtac catactaatt ctcttctgcc caacgacggc tgccattagt     120
cagcatggcg cgcacgtgac tacaactgtg gctggaaacc ttttcgtcct ccccggtttt     180
tcagtgagcc gactctacta caatgctttt tcatttttca ctcagaaaaa cctgcaattt     240
gccaaattgg ccatgctctg tgcctccctt gacaaaggac atcttccctg tttataaacg     300
gcggcttacc aaaagttgaa gcttgttctt gcctcttatg agtggagcaa tcgattatat     360
tgaatcgttg tgctggagta gttggatctt tccacgtggt ctcgagtcac ttgtagaagc     420
tgaaaattga gcagatttag tatagggcta cattgtaggg tggtttagag tatcgaaaat     480
atacatatag aagaataaa                                                  499
```

<210> SEQ ID NO 2
<211> LENGTH: 500
<212> TYPE: DNA
<213> ORGANISM: Unknown
<220> FEATURE:
<223> OTHER INFORMATION: Saccharomyces cerevisiae CJ-5

<400> SEQUENCE: 2

```
ctcttgaatg gcgacagcct attgcctcag tgttccctca acaaccttgg tagttggagc      60
gcaattagcg tatcctgtac catactaatt ctcttctgcc caacgacggc tgccattagt     120
cagcatggcg cgcacgtgac tacaactgtg gctggaaacc ttttcgtcct ccccggtttt     180
tcagtgagcc gactctacta caatgctttt tcattttttca ctcagaaaaa cctgcaattt    240
tccaaattgg ccatgctctg tgcctcccct gacaaaggac atcttccctg tttataaacg     300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                 500
```

<210> SEQ ID NO 3
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92 94
      102 103 249 251

<400> SEQUENCE: 3

```
ctcttgaatg gcgacagcct attgcccag tgttccctca acaaccttgg tagttggagc       60
gcaattagcg tatcctgtac catactaatt ccctctgcc cctcgacggc tgccattagt     120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt    240
gccaaattag tcatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 4
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92 94
      102 103

<400> SEQUENCE: 4

```
ctcttgaatg gcgacagcct attgcccag tgttccctca acaaccttgg tagttggagc       60
gcaattagcg tatcctgtac catactaatt ccctctgcc cctcgacggc tgccattagt     120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt    240
gccaaattgg ccatgctctg tgcctcccct gacaaaggac atcttccctg tttataaacg    300
gcggcttacc aaaagttgaa gcttgttctt gcttcttatg agtggagcaa tcgattatat    360
```

```
tgaatcgttg tgctggagta gttggatctt ccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 5
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-249
      251

<400> SEQUENCE: 5

```
ctcttgaatg gcgacagcct attgccccag tgttccctca acaaccttgg tagttggagc    60
gcaattagcg tatcctgtac catactaatt ctcttctgcc caacgacggc tgccattagt   120
cagcatggcg cgcacgtgac tacaactgtg gctggaaacc ttttcgtcct ccccggtttt   180
tcagtgagcc gactctacta caatgctttt tcattttca ctcagaaaaa cctgcaattt    240
gccaaattag tcatgctctg tgcctccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt ccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 6
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-102
      103

<400> SEQUENCE: 6

```
ctcttgaatg gcgacagcct attgccccag tgttccctca acaaccttgg tagttggagc    60
gcaattagcg tatcctgtac catactaatt ctcttctgcc cctcgacggc tgccattagt   120
cagcatggcg cgcacgtgac tacaactgtg gctggaaacc ttttcgtcct ccccggtttt   180
tcagtgagcc gactctacta caatgctttt tcattttca ctcagaaaaa cctgcaattt    240
gccaaattgg ccatgctctg tgcctccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt ccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 7
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92
      102

<400> SEQUENCE: 7

```
ctcttgaatg gcgacagcct attgccccag tgttccctca acaaccttgg tagttggagc    60
gcaattagcg tatcctgtac catactaatt cccttctgcc ccacgacggc tgccattagt   120
```

```
cagcatggcg cgcacgtgac tacaactgtg gctggaaacc ttttcgtcct ccccggtttt    180
tcagtgagcc gactctacta caatgctttt tcattttttca ctcagaaaaa cctgcaattt    240
gccaaattgg ccatgctctg tgcctcccct tgacaaaggac atcttccctg tttataaacg    300
gcggcttacc aaaagttgaa gcttgttctt gcctcttatg agtggagcaa tcgattatat    360
tgaatcgttg tgctggagta gttggatctt tccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 8
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92
      103

<400> SEQUENCE: 8

```
ctcttgaatg gcgacagcct attgccccag tgttccctca acaaccttgg tagttggagc     60
gcaattagcg tatcctgtac catactaatt cccttctgcc catcgacggc tgccattagt    120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt    240
gccaaattgg ccatgctctg tgcctcccct tgacaaaggac atcttccctg tttataaacg    300
gcggcttacc aaaagttgaa gcttgttctt gcctcttatg agtggagcaa tcgattatat    360
tgaatcgttg tgctggagta gttggatctt tccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 9
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-94
      102

<400> SEQUENCE: 9

```
ctcttgaatg gcgacagcct attgccccag tgttccctca acaaccttgg tagttggagc     60
gcaattagcg tatcctgtac catactaatt ctcctctgcc ccacgacggc tgccattagt    120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt    240
gccaaattgg ccatgctctg tgcctcccct tgacaaaggac atcttccctg tttataaacg    300
gcggcttacc aaaagttgaa gcttgttctt gcctcttatg agtggagcaa tcgattatat    360
tgaatcgttg tgctggagta gttggatctt tccacgtggt ctcgagtcac ttgtagaagc    420
tgaaaattga gcagatttag tatagggcta cattgtaggg tggtttagag tatcgaaaat    480
atacatatag aagaataaa                                                  499
```

<210> SEQ ID NO 10
<211> LENGTH: 499
<212> TYPE: DNA
<213> ORGANISM: Artificial Sequence
<220> FEATURE:

<223> OTHER INFORMATION: S. cerevisiae CEN.PK-1D promoter-mutation-94
     103

<400> SEQUENCE: 10
ctcttgaatg gcgacagcct attgccccag tgttccctca acaaccttgg tagttggagc    60
gcaattagcg tatcctgtac catactaatt ctcctctgcc catcgacggc tgccattagt   120
cagcatggcg cgcacgtgac tacaactgtg gctggaaacc ttttcgtcct ccccggtttt   180
tcagtgagcc gactctacta caatgctttt tcattttca ctcagaaaaa cctgcaattt    240
gccaaattgg ccatgctctg tgcctccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt ccacgtggt ctcgagtcac ttgtagaagc    420
tgaaaattga gcagatttag tatagggcta cattgtaggg tggtttagag tatcgaaaat   480
atacatatag aagaataaa                                                499

<210> SEQ ID NO 11
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92 94

<400> SEQUENCE: 11
ctcttgaatg gcgacagcct attgccccag tgttccctca acaaccttgg tagttggagc    60
gcaattagcg tatcctgtac catactaatt ccctctgcc caacgacggc tgccattagt    120
cagcatggcg cgcacgtgac tacaactgtg gctggaaacc ttttcgtcct ccccggtttt   180
tcagtgagcc gactctacta caatgctttt tcattttca ctcagaaaaa cctgcaattt    240
gccaaattgg ccatgctctg tgcctccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt ccacgtggt ctcgagtcac ttgtagaagc    420
tgaaaattga gcagatttag tatagggcta cattgtaggg tggtttagag tatcgaaaat   480
atacatatag aagaataaa                                                499

<210> SEQ ID NO 12
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-249

<400> SEQUENCE: 12
ctcttgaatg gcgacagcct attgccccag tgttccctca acaaccttgg tagttggagc    60
gcaattagcg tatcctgtac catactaatt ctcttctgcc caacgacggc tgccattagt   120
cagcatggcg cgcacgtgac tacaactgtg gctggaaacc ttttcgtcct ccccggtttt   180
tcagtgagcc gactctacta caatgctttt tcattttca ctcagaaaaa cctgcaattt    240
gccaaattag ccatgctctg tgcctccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt ccacgtggt ctcgagtcac ttgtagaagc    420
tgaaaattga gcagatttag tatagggcta cattgtaggg tggtttagag tatcgaaaat   480
atacatatag aagaataaa                                                499

-continued

<210> SEQ ID NO 13
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-251

<400> SEQUENCE: 13

```
ctcttgaatg gcgacagcct attgccccag tgttccctca acaaccttgg tagttggagc    60
gcaattagcg tatcctgtac catactaatt ctcttctgcc caacgacggc tgccattagt   120
cagcatggcg cgcacgtgac tacaactgtg gctggaaacc ttttcgtcct ccccggtttt   180
tcagtgagcc gactctacta caatgctttt tcattttttca ctcagaaaaa cctgcaattt   240
gccaaattgg tcatgctctg tgcctcccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt tccacgtggt ctcgagtcac ttgtagaagc   420
tgaaaattga gcagatttag tatagggcta cattgtaggg tggtttagag tatcgaaaat   480
atacatatag aagaataaa                                                499
```

<210> SEQ ID NO 14
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-92

<400> SEQUENCE: 14

```
ctcttgaatg gcgacagcct attgccccag tgttccctca acaaccttgg tagttggagc    60
gcaattagcg tatcctgtac catactaatt cccttctgcc caacgacggc tgccattagt   120
cagcatggcg cgcacgtgac tacaactgtg gctggaaacc ttttcgtcct ccccggtttt   180
tcagtgagcc gactctacta caatgctttt tcattttttca ctcagaaaaa cctgcaattt   240
gccaaattgg ccatgctctg tgcctcccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt tccacgtggt ctcgagtcac ttgtagaagc   420
tgaaaattga gcagatttag tatagggcta cattgtaggg tggtttagag tatcgaaaat   480
atacatatag aagaataaa                                                499
```

<210> SEQ ID NO 15
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-94

<400> SEQUENCE: 15

```
ctcttgaatg gcgacagcct attgccccag tgttccctca acaaccttgg tagttggagc    60
gcaattagcg tatcctgtac catactaatt ctcctctgcc caacgacggc tgccattagt   120
cagcatggcg cgcacgtgac tacaactgtg gctggaaacc ttttcgtcct ccccggtttt   180
tcagtgagcc gactctacta caatgctttt tcattttttca ctcagaaaaa cctgcaattt   240
gccaaattgg ccatgctctg tgcctcccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt tccacgtggt ctcgagtcac ttgtagaagc   420
```

```
tgaaaattga gcagatttag tataqggcta cattgtaggg tggtttagag tatcgaaaat    480
atacatatag aagaataaa                                                 499

<210> SEQ ID NO 16
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-102

<400> SEQUENCE: 16
ctcttgaatg gcgacagcct attgccccag tgttccctca acaaccttgg tagttggagc     60
gcaattagcg tatcctgtac catactaatt ctcttctgcc ccacgacggc tgccattagt    120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt   240
gccaaattgg ccatgctctg tgcctcccctt gacaaaggac atcttccctg tttataaacg   300
gcggcttacc aaaagttgaa gcttgttctt gcctcttatg agtggagcaa tcgattatat   360
tgaatcgttg tgctggagta gttggatctt tccacgtggt ctcgagtcac ttgtagaagc   420
tgaaaattga gcagatttag tatagggcta cattgtaggg tggtttagag tatcgaaaat   480
atacatatag aagaataaa                                                499

<210> SEQ ID NO 17
<211> LENGTH: 499
<212> TYPE: DNA
<213> ORGANISM: Artificial Sequence
<220> FEATURE:
<223> OTHER INFORMATION: S. cerevisiae CEN.PK-1D promoter-mutation-103

<400> SEQUENCE: 17
ctcttgaatg gcgacagcct attgccccag tgttccctca acaaccttgg tagttggagc     60
gcaattagcg tatcctgtac catactaatt ctcttctgcc catcgacggc tgccattagt    120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt   240
gccaaattgg ccatgctctg tgcctccctt gacaaaggac atcttccctg tttataaacg    300
gcggcttacc aaaagttgaa gcttgttctt gcctcttatg agtggagcaa tcgattatat   360
tgaatcgttg tgctggagta gttggatctt tccacgtggt ctcgagtcac ttgtagaagc   420
tgaaaattga gcagatttag tatagggcta cattgtaggg tggtttagag tatcgaaaat   480
atacatatag aagaataaa                                                499

<210> SEQ ID NO 18
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92 94 102
      103 249 251

<400> SEQUENCE: 18
ctcttgaatg gcgacagcct attgcctcag tgttccctca acaaccttgg tagttggagc     60
gcaattagcg tatcctgtac catactaatt ccctctgcc cctcgacggc tgccattagt    120
cagcatggcg cgcacgtgac tacaactgtg gctggaaacc ttttcgtcct ccccggtttt    180
tcagtgagcc gactctacta caatgctttt tcattttttca ctcagaaaaa cctgcaattt   240
```

```
tccaaattag tcatgctctg tgcctcccct gacaaaggac atcttccctg tttataaacg        300
gcggcttacc aaaagttgaa gcttgttctt gcttcttatg agtggagcaa tcgattatat        360
tgaatcgttg tgctggagta gttggatctt tccacgtggt ctcgagtcac ttgtagaagc        420
tgaaaaattg agcaggttta gtatagggct acattgtagg gtggtttaga gtatcgaaaa        480
tatacatata gaagaataaa                                                    500
```

```
<210> SEQ ID NO 19
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92 94 102
      103

<400> SEQUENCE: 19
ctcttgaatg gcgacagcct attgcctcag tgttccctca acaaccttgg tagttggagc        60
gcaattagcg tatcctgtac catactaatt cccctctgcc cctcgacggc tgccattagt        120
cagcatggcg cgcacgtgac tacaactgtg gctggaaacc ttttcgtcct ccccggtttt        180
tcagtgagcc gactctacta caatgctttt tcattttttca ctcagaaaaa cctgcaattt        240
tccaaattgg ccatgctctg tgcctcccct gacaaaggac atcttccctg tttataaacg        300
gcggcttacc aaaagttgaa gcttgttctt gcttcttatg agtggagcaa tcgattatat        360
tgaatcgttg tgctggagta gttggatctt tccacgtggt ctcgagtcac ttgtagaagc        420
tgaaaaattg agcaggttta gtatagggct acattgtagg gtggtttaga gtatcgaaaa        480
tatacatata gaagaataaa                                                    500
```

```
<210> SEQ ID NO 20
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-249 251

<400> SEQUENCE: 20
ctcttgaatg gcgacagcct attgcctcag tgttccctca acaaccttgg tagttggagc        60
gcaattagcg tatcctgtac catactaatt ctcttctgcc caacgacggc tgccattagt        120
cagcatggcg cgcacgtgac tacaactgtg gctggaaacc ttttcgtcct ccccggtttt        180
tcagtgagcc gactctacta caatgctttt tcattttttca ctcagaaaaa cctgcaattt        240
tccaaattag tcatgctctg tgcctcccct gacaaaggac atcttccctg tttataaacg        300
gcggcttacc aaaagttgaa gcttgttctt gcttcttatg agtggagcaa tcgattatat        360
tgaatcgttg tgctggagta gttggatctt tccacgtggt ctcgagtcac ttgtagaagc        420
tgaaaaattg agcaggttta gtatagggct acattgtagg gtggtttaga gtatcgaaaa        480
tatacatata gaagaataaa                                                    500
```

```
<210> SEQ ID NO 21
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-102 103

<400> SEQUENCE: 21
ctcttgaatg gcgacagcct attgcctcag tgttccctca acaaccttgg tagttggagc        60
```

```
gcaattagcg tatcctgtac catactaatt ctcttctgcc cctcgacggc tgccattagt    120
cagcatggcg cgcacgtgac tacaactgtg gctggaaacc ttttcgtcct ccccggtttt    180
tcagtgagcc gactctacta caatgctttt tcattttca ctcagaaaaa cctgcaattt     240
tccaaattgg ccatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500
```

<210> SEQ ID NO 22
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92 102

<400> SEQUENCE: 22

```
ctcttgaatg gcgacagcct attgcctcag tgttccctca acaaccttgg tagttggagc     60
gcaattagcg tatcctgtac catactaatt cccttctgcc ccacgacggc tgccattagt    120
cagcatggcg cgcacgtgac tacaactgtg gctggaaacc ttttcgtcct ccccggtttt    180
tcagtgagcc gactctacta caatgctttt tcattttca ctcagaaaaa cctgcaattt     240
tccaaattgg ccatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500
```

<210> SEQ ID NO 23
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92 103

<400> SEQUENCE: 23

```
ctcttgaatg gcgacagcct attgcctcag tgttccctca acaaccttgg tagttggagc     60
gcaattagcg tatcctgtac catactaatt cccttctgcc catcgacggc tgccattagt    120
cagcatggcg cgcacgtgac tacaactgtg gctggaaacc ttttcgtcct ccccggtttt    180
tcagtgagcc gactctacta caatgctttt tcattttca ctcagaaaaa cctgcaattt     240
tccaaattgg ccatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500
```

<210> SEQ ID NO 24
<211> LENGTH: 500
<212> TYPE: DNA
<213> ORGANISM: Artificial Sequence
<220> FEATURE:

<223> OTHER INFORMATION: S. cerevisiae CJ-5 promoter-mutation-94 102

<400> SEQUENCE: 24

```
ctcttgaatg gcgacagcct attgcctcag tgttccctca acaaccttgg tagttggagc    60
gcaattagcg tatcctgtac catactaatt ctcctctgcc ccacgacggc tgccattagt   120
cagcatggcg cgcacgtgac tacaactgtg gctggaaacc ttttcgtcct ccccggtttt   180
tcagtgagcc gactctacta caatgctttt tcatttttca ctcagaaaaa cctgcaattt   240
tccaaattgg ccatgctctg tgcctccctt gacaaaggac atcttccctg tttataaacg   300
gcggcttacc aaaagttgaa gcttgttctt gcttcttatg agtggagcaa tcgattatat   360
tgaatcgttg tgctggagta gttggatctt tccacgtggt ctcgagtcac ttgtagaagc   420
tgaaaaattg agcaggttta gtatagggct acattgtagg gtggtttaga gtatcgaaaa   480
tatacatata gaagaataaa                                              500
```

<210> SEQ ID NO 25
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-94 103

<400> SEQUENCE: 25

```
ctcttgaatg gcgacagcct attgcctcag tgttccctca acaaccttgg tagttggagc    60
gcaattagcg tatcctgtac catactaatt ctcctctgcc catcgacggc tgccattagt   120
cagcatggcg cgcacgtgac tacaactgtg gctggaaacc ttttcgtcct ccccggtttt   180
tcagtgagcc gactctacta caatgctttt tcatttttca ctcagaaaaa cctgcaattt   240
tccaaattgg ccatgctctg tgcctccctt gacaaaggac atcttccctg tttataaacg   300
gcggcttacc aaaagttgaa gcttgttctt gcttcttatg agtggagcaa tcgattatat   360
tgaatcgttg tgctggagta gttggatctt tccacgtggt ctcgagtcac ttgtagaagc   420
tgaaaaattg agcaggttta gtatagggct acattgtagg gtggtttaga gtatcgaaaa   480
tatacatata gaagaataaa                                              500
```

<210> SEQ ID NO 26
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92 94

<400> SEQUENCE: 26

```
ctcttgaatg gcgacagcct attgcctcag tgttccctca acaaccttgg tagttggagc    60
gcaattagcg tatcctgtac catactaatt cccctctgcc caacgacggc tgccattagt   120
cagcatggcg cgcacgtgac tacaactgtg gctggaaacc ttttcgtcct ccccggtttt   180
tcagtgagcc gactctacta caatgctttt tcatttttca ctcagaaaaa cctgcaattt   240
tccaaattgg ccatgctctg tgcctccctt gacaaaggac atcttccctg tttataaacg   300
gcggcttacc aaaagttgaa gcttgttctt gcttcttatg agtggagcaa tcgattatat   360
tgaatcgttg tgctggagta gttggatctt tccacgtggt ctcgagtcac ttgtagaagc   420
tgaaaaattg agcaggttta gtatagggct acattgtagg gtggtttaga gtatcgaaaa   480
tatacatata gaagaataaa                                              500
```

```
<210> SEQ ID NO 27
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-249

<400> SEQUENCE: 27
ctcttgaatg gcgacagcct attgcctcag tgttccctca acaaccttgg tagttggagc      60
gcaattagcg tatcctgtac catactaatt ctcttctgcc caacgacggc tgccattagt     120
cagcatggcg cgcacgtgac tacaactgtg gctggaaacc ttttcgtcct ccccggtttt     180
tcagtgagcc gactctacta caatgctttt tcattttttca ctcagaaaaa cctgcaattt     240
tccaaattag ccatgctctg tgcctccctt gacaaaggac atcttccctg tttataaacg     300
gcggcttacc aaaagttgaa gcttgttctt gcttcttatg agtggagcaa tcgattatat     360
tgaatcgttg tgctggagta gttggatctt tccacgtggt ctcgagtcac ttgtagaagc     420
tgaaaaattg agcaggttta gtatagggct acattgtagg gtggtttaga gtatcgaaaa     480
tatacatata gaagaataaa                                                 500

<210> SEQ ID NO 28
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-251

<400> SEQUENCE: 28
ctcttgaatg gcgacagcct attgcctcag tgttccctca acaaccttgg tagttggagc      60
gcaattagcg tatcctgtac catactaatt ctcttctgcc caacgacggc tgccattagt     120
cagcatggcg cgcacgtgac tacaactgtg gctggaaacc ttttcgtcct ccccggtttt     180
tcagtgagcc gactctacta caatgctttt tcattttttca ctcagaaaaa cctgcaattt     240
tccaaattgg tcatgctctg tgcctccctt gacaaaggac atcttccctg tttataaacg     300
gcggcttacc aaaagttgaa gcttgttctt gcttcttatg agtggagcaa tcgattatat     360
tgaatcgttg tgctggagta gttggatctt tccacgtggt ctcgagtcac ttgtagaagc     420
tgaaaaattg agcaggttta gtatagggct acattgtagg gtggtttaga gtatcgaaaa     480
tatacatata gaagaataaa                                                 500

<210> SEQ ID NO 29
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-92

<400> SEQUENCE: 29
ctcttgaatg gcgacagcct attgcctcag tgttccctca acaaccttgg tagttggagc      60
gcaattagcg tatcctgtac catactaatt cccttctgcc caacgacggc tgccattagt     120
cagcatggcg cgcacgtgac tacaactgtg gctggaaacc ttttcgtcct ccccggtttt     180
tcagtgagcc gactctacta caatgctttt tcattttttca ctcagaaaaa cctgcaattt     240
tccaaattgg ccatgctctg tgcctccctt gacaaaggac atcttccctg tttataaacg     300
gcggcttacc aaaagttgaa gcttgttctt gcttcttatg agtggagcaa tcgattatat     360
tgaatcgttg tgctggagta gttggatctt tccacgtggt ctcgagtcac ttgtagaagc     420
```

```
tgaaaaattg agcaggttta gtatagggct acattgtagg gtggtttaga gtatcgaaaa    480
tatacatata gaagaataaa                                                500

<210> SEQ ID NO 30
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-94

<400> SEQUENCE: 30
ctcttgaatg gcgacagcct attgcctcag tgttccctca acaaccttgg tagttggagc     60
gcaattagcg tatcctgtac catactaatt ctcctctgcc caacgacggc tgccattagt    120
cagcatggcg cgcacgtgac tacaactgtg gctggaaacc ttttcgtcct ccccggtttt    180
tcagtgagcc gactctacta caatgctttt tcatttttca ctcagaaaaa cctgcaattt    240
tccaaattgg ccatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500

<210> SEQ ID NO 31
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-102

<400> SEQUENCE: 31
ctcttgaatg gcgacagcct attgcctcag tgttccctca acaaccttgg tagttggagc     60
gcaattagcg tatcctgtac catactaatt ctcttctgcc ccacgacggc tgccattagt    120
cagcatggcg cgcacgtgac tacaactgtg gctggaaacc ttttcgtcct ccccggtttt    180
tcagtgagcc gactctacta caatgctttt tcatttttca ctcagaaaaa cctgcaattt    240
tccaaattgg ccatgctctg tgcctcccct gacaaaggac atcttccctg tttataaacg    300
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500

<210> SEQ ID NO 32
<211> LENGTH: 500
<212> TYPE: DNA
<213> ORGANISM: Artificial Sequence
<220> FEATURE:
<223> OTHER INFORMATION: S. cerevisiae CJ-5 promoter-mutation-103

<400> SEQUENCE: 32
ctcttgaatg gcgacagcct attgcctcag tgttccctca acaaccttgg tagttggagc     60
gcaattagcg tatcctgtac catactaatt ctcttctgcc catcgacggc tgccattagt    120
cagcatggcg cgcacgtgac tacaactgtg gctggaaacc ttttcgtcct ccccggtttt    180
tcagtgagcc gactctacta caatgctttt tcatttttca ctcagaaaaa cctgcaattt    240
tccaaattgg ccatgctctg tgcctcccct gacaaaggac atcttccctg tttataaacg    300
```

```
gcggcttacc aaaagttgaa gcttgttctt gcttcttatg agtggagcaa tcgattatat    360
tgaatcgttg tgctggagta gttggatctt tccacgtggt ctcgagtcac ttgtagaagc    420
tgaaaaattg agcaggttta gtatagggct acattgtagg gtggtttaga gtatcgaaaa    480
tatacatata gaagaataaa                                                500

<210> SEQ ID NO 33
<211> LENGTH: 678
<212> TYPE: PRT
<213> ORGANISM: Saccharomyces cerevisiae

<400> SEQUENCE: 33
```

| | | | | | | | | | | | | | | | |
|---|---|---|---|---|---|---|---|---|---|---|---|---|---|---|---|
| Met | Gly | Leu | Leu | Ala | Leu | Gly | Thr | Pro | Leu | Gln | Trp | Phe | Glu | Ser | Arg |
| 1 | | | | 5 | | | | | 10 | | | | | 15 | |
| Thr | Tyr | Asn | Glu | His | Ile | Arg | Asp | Glu | Gly | Ile | Glu | Gln | Leu | Leu | Tyr |
| | | | 20 | | | | | 25 | | | | | 30 | | |
| Ile | Phe | Gln | Ala | Ala | Gly | Lys | Arg | Asp | Asn | Asp | Pro | Leu | Phe | Trp | Gly |
| | | | 35 | | | | 40 | | | | | 45 | | | |
| Asp | Glu | Leu | Glu | Tyr | Met | Val | Val | Asp | Phe | Asp | Lys | Glu | Arg | Asn | |
| | 50 | | | | | 55 | | | | | 60 | | | | |
| Ser | Met | Leu | Asp | Val | Cys | His | Asp | Lys | Ile | Leu | Thr | Glu | Leu | Asn | Met |
| 65 | | | | | 70 | | | | | 75 | | | | | 80 |
| Glu | Asp | Ser | Ser | Leu | Cys | Glu | Ala | Asn | Asp | Val | Ser | Phe | His | Pro | Glu |
| | | | | 85 | | | | | 90 | | | | | 95 | |
| Tyr | Gly | Arg | Tyr | Met | Leu | Glu | Ala | Thr | Pro | Ala | Ser | Pro | Tyr | Leu | Asn |
| | | | 100 | | | | | 105 | | | | | 110 | | |
| Tyr | Val | Gly | Ser | Tyr | Val | Glu | Val | Asn | Met | Gln | Lys | Arg | Arg | Ala | Ile |
| | | | 115 | | | | | 120 | | | | | 125 | | |
| Ala | Glu | Tyr | Lys | Leu | Ser | Glu | Tyr | Ala | Arg | Gln | Asp | Ser | Lys | Asn | Asn |
| | 130 | | | | | 135 | | | | | 140 | | | | |
| Leu | His | Val | Gly | Ser | Arg | Ser | Val | Pro | Leu | Thr | Leu | Thr | Val | Phe | Pro |
| 145 | | | | | 150 | | | | | 155 | | | | | 160 |
| Arg | Met | Gly | Cys | Pro | Asp | Phe | Ile | Asn | Ile | Lys | Asp | Pro | Trp | Asn | His |
| | | | | 165 | | | | | 170 | | | | | 175 | |
| Lys | Asn | Ala | Ala | Ser | Arg | Ser | Leu | Phe | Leu | Pro | Asp | Glu | Val | Ile | Asn |
| | | | 180 | | | | | 185 | | | | | 190 | | |
| Arg | His | Val | Arg | Phe | Pro | Asn | Leu | Thr | Ala | Ser | Ile | Arg | Thr | Arg | Arg |
| | | | 195 | | | | | 200 | | | | | 205 | | |
| Gly | Glu | Lys | Val | Cys | Met | Asn | Val | Pro | Met | Tyr | Lys | Asp | Ile | Ala | Thr |
| | 210 | | | | | 215 | | | | | 220 | | | | |
| Pro | Glu | Thr | Asp | Asp | Ser | Ile | Tyr | Asp | Arg | Asp | Trp | Phe | Leu | Pro | Glu |
| 225 | | | | | 230 | | | | | 235 | | | | | 240 |
| Asp | Lys | Glu | Ala | Lys | Leu | Ala | Ser | Lys | Pro | Gly | Phe | Ile | Tyr | Met | Asp |
| | | | | 245 | | | | | 250 | | | | | 255 | |
| Ser | Met | Gly | Phe | Gly | Met | Gly | Cys | Ser | Cys | Leu | Gln | Val | Thr | Phe | Gln |
| | | | 260 | | | | | 265 | | | | | 270 | | |
| Ala | Pro | Asn | Ile | Asn | Lys | Ala | Arg | Tyr | Leu | Tyr | Asp | Ala | Leu | Val | Asn |
| | | | 275 | | | | | 280 | | | | | 285 | | |
| Phe | Ala | Pro | Ile | Met | Leu | Ala | Phe | Ser | Ala | Ala | Pro | Ala | Phe | Lys | |
| | 290 | | | | | 295 | | | | | 300 | | | | |
| Gly | Trp | Leu | Ala | Asp | Gln | Asp | Val | Arg | Trp | Asn | Val | Ile | Ser | Gly | Ala |
| 305 | | | | | 310 | | | | | 315 | | | | | 320 |
| Val | Asp | Asp | Arg | Thr | Pro | Lys | Glu | Arg | Gly | Val | Ala | Pro | Leu | Leu | Pro |
| | | | | 325 | | | | | 330 | | | | | 335 | |

Lys Tyr Asn Lys Asn Gly Phe Gly Ile Ala Lys Asp Val Gln Asp
                340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
        370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
        420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
        450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
            485                 490                 495

Ile Leu Thr Phe Ser Asp Asn Ile Asn Ala Tyr Ile His Met Ser Lys
        500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Ser Lys His Glu Arg Leu
        580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
        610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
            645                 650                 655

Ser Phe Leu Gly Ala Glu Ile Ala Glu Tyr Val Lys Lys Asn Lys Pro
        660                 665                 670

Ser Ile Glu Ser Lys Cys
            675

<210> SEQ ID NO 34
<211> LENGTH: 33
<212> TYPE: DNA
<213> ORGANISM: Artificial Sequence
<220> FEATURE:
<223> OTHER INFORMATION: F_BamHI_GSH1

<400> SEQUENCE: 34
ggtaggatcc atgggactct tagctttggg cac        33

```
<210> SEQ ID NO 35
<211> LENGTH: 25
<212> TYPE: DNA
<213> ORGANISM: Artificial Sequence
<220> FEATURE:
<223> OTHER INFORMATION: R_GSH1_C86R

<400> SEQUENCE: 35
ttagcctccc taagggacga atcct                                           25

<210> SEQ ID NO 36
<211> LENGTH: 25
<212> TYPE: DNA
<213> ORGANISM: Artificial Sequence
<220> FEATURE:
<223> OTHER INFORMATION: F_GSH1_C86R

<400> SEQUENCE: 36
cgtcccttag ggaggctaac gatgt                                           25

<210> SEQ ID NO 37
<211> LENGTH: 35
<212> TYPE: DNA
<213> ORGANISM: Artificial Sequence
<220> FEATURE:
<223> OTHER INFORMATION: R_XhoI_GSH1

<400> SEQUENCE: 37
atgactcgag ttaacatttg ctttctattg aaggc                                35

<210> SEQ ID NO 38
<211> LENGTH: 33
<212> TYPE: DNA
<213> ORGANISM: Artificial Sequence
<220> FEATURE:
<223> OTHER INFORMATION: F_SpeI_GSH1_DW

<400> SEQUENCE: 38
tagaactagt actccttta tttcggttgt gaa                                   33

<210> SEQ ID NO 39
<211> LENGTH: 35
<212> TYPE: DNA
<213> ORGANISM: Artificial Sequence
<220> FEATURE:
<223> OTHER INFORMATION: R_NcoI_GSH1_DW

<400> SEQUENCE: 39
gctgccatgg gaatagtgtg aaccgataac tgtgt                                35

<210> SEQ ID NO 40
<211> LENGTH: 27
<212> TYPE: DNA
<213> ORGANISM: Artificial Sequence
<220> FEATURE:
<223> OTHER INFORMATION: R_AL killer

<400> SEQUENCE: 40
gagcaatgaa cccaataacg aaatctt                                         27

<210> SEQ ID NO 41
<211> LENGTH: 24
<212> TYPE: DNA
<213> ORGANISM: Artificial Sequence
<220> FEATURE:
<223> OTHER INFORMATION: F_BR killer
```

```
<400> SEQUENCE: 41
cttgacgttc gttcgactga tgag                                              24
```

PROMOTER AND METHOD OF PRODUCING GLUTATHIONE USING THE SAME

SEQUENCE LISTING SUBMISSION VIA EFS-WEB

A computer readable text file, entitled "SequenceListing.txt," created on Jul. 12, 2022 with a file size of 34,532 bytes contains the sequence listing for this application and is hereby incorporated by reference in its entirety.

TECHNICAL FIELD

The present disclosure relates to a novel promoter, a vector including the same, a microorganism including the same, and a method of producing glutathione using the same.

BACKGROUND ART

Glutathione (GSH), as an organic sulfur compound commonly present in most cells, is a tripeptide composed of three amino acids: glycine, glutamate, and cysteine.

Glutathione is present in the living body in a reduced form of glutathione (GSH) and in an oxidized form of glutathione (GSSG). The reduced form of glutathione (GSH), which is present in a relatively high proportion under normal circumstances, is mainly distributed in the liver and skin cells in the human body and has important roles of an antioxidant function in decomposing and removing reactive oxygen, a detoxification function in removing xenobiotic compounds such as toxic substances, and a whitening function in inhibiting melanin production (Sipes I G et al., "The role of glutathione in the toxicity of xenobiotic compounds: metabolic activation of 1,2-dibromoethane by glutathione", $Adv$ $Exp$ $Med$ $Biol.$ 1986; 197:457-67).

Since glutathione production gradually decreases as the aging process progresses, and a decrease in production of glutathione, which has important roles in antioxidant and detoxification functions, promotes accumulation of reactive oxygen, which is a main cause of aging, there is a need to supply glutathione from the outside.

Having various functions as described above, glutathione has drawn attention as a substance in various fields such as pharmaceuticals, health functional foods, and cosmetics, and is also used to manufacture taste ingredients and food and feed additives. It is known that glutathione has great effects on enriching the taste of raw ingredients and maintaining rich flavors, and that it may be used alone or in combination with other substances as a kokumi flavor enhancer. In general, kokumi substances are known to have richer flavors than umami substances such as known nucleic acids and monosodium glutamate (MSG), and are known to be generated by protein decomposition during ripening.

Although there is a growing demand for glutathione for application to various fields, the market therefor is not activated due to high costs for industrial production of glutathione, since enzyme synthesis processes have not been commercialized due to high costs, and methods of extracting glutathione from microorganisms provide low yields.

DISCLOSURE

Technical Problem

The present disclosure provides a novel promoter, a vector including the same, a microorganism including the same, and a method of producing glutathione using the same.

Technical Solution

The present disclosure provides a polynucleotide having promoter activity and at least one nucleotide selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 is substituted with a different nucleotide.

The present disclosure provides a vector including the polynucleotide having promoter activity.

The present disclosure provides a microorganism belonging to the genus $Saccharomyces$ sp. including one or more of: the polynucleotide having promoter activity and a gene encoding a target protein; and a vector including the same.

The present disclosure provides a method of producing glutathione, the method including culturing the microorganism in a culture medium.

Advantageous Effects

The novel promoter sequence of the present disclosure significantly increases glutathione production and thus may be used in production of glutathione with a high yield.

Best Mode

The present disclosure will be described in detail. Meanwhile, each description and embodiment disclosed in the present disclosure may be applied to different descriptions and embodiments herein. In other words, all combinations of various components disclosed in the present disclosure are included within the scope of the present disclosure. Furthermore, the scope of the present disclosure should not be limited by the descriptions provided below.

Those skilled in the art will recognize or be able to ascertain, using no more than routine experimentation, many equivalents to specific embodiments of the present disclosure. Such equivalents are intended to be encompassed in the scope of the following claims.

An aspect of the present disclosure provides a polynucleotide having promoter activity in which at least one nucleotide selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 is substituted with a different nucleotide.

As used herein, the term "polynucleotide" refers to a DNA strand having a certain minimum length as a polymer of nucleotides in which nucleotide monomers are linked to each other in the form of a long chain by covalent bonds.

As used herein, the term "polynucleotide having promoter activity" refers to a region of DNA near a site where transcription of a gene to be expressed, i.e., a target gene, initiates, the region including a site to which an RNA polymerase, enhancer, or the like binds for expression of the target gene.

The polynucleotide having promoter activity of the present disclosure may be used as a general-use promoter for enhancement.

For example, the polynucleotide may be used as a promoter capable of enhancing expression of a polypeptide having glutamate-cysteine ligase activity.

Also, the polynucleotide may be a polynucleotide used to increase production or output of glutathione. The polynucleotide of the present disclosure may include any polynucleotide sequence having promoter activity.

In the present disclosure, the polynucleotide sequence of SEQ ID NO: 1 or 2 may be a sequence capable of functioning as a promoter of the glutamate-cysteine ligase.

However, the polynucleotide sequence of SEQ ID NO: 1 or 2 is a representative polynucleotide sequence indicating a position of modification, and any polynucleotide sequence corresponding thereto and having promoter activity may also be included in sequences allowing introduction of modification. For example, any polynucleotide sequence capable of functioning as a promoter of the glutamate-cysteine ligase or a polypeptide having equivalent activity thereto may be included in the scope of the sequence into which a modification of the present disclosure is introduced without limitation. In such sequences, when at least one of the nucleotides corresponding to the $92^{nd}$, $94^{th}$, $102^{nd}$, $103^{rd}$, $249^{th}$, and $251^{st}$ nucleotides of SEQ ID NO: 1 or 2 is substituted with a different nucleotide, a promoter having higher activity than an unsubstituted (non-modified) promoter sequence may be provided.

The nucleotide sequence of SEQ ID NO: 1 or 2 may be obtained from the known database of NCBI GenBank. The sequences corresponding to SEQ ID NO: 1 or 2 and serving as a promoter of the glutamate-cysteine ligase may be derived from a microorganism belonging to the genus *Saccharomyces* sp., specifically *Saccharomyces cerevisiae*, without being limited thereto, and may include any sequence having activity equivalent to that of the polynucleotide without limitation.

In the present disclosure, the polynucleotide having promoter activity may be the polynucleotide sequence of SEQ ID NO: 1 or 2 or a polynucleotide sequence having at least 70%, 80%, 85%, 90%, 95%, 96%, 97%, 98%, or 99% homology or identity with SEQ ID NO: 1 or 2, in which at least one nucleotide is substituted with a different nucleotide at the particular positions or positions corresponding thereto. The polynucleotide sequence having homology or identity may exclude a sequence having 100% identity or may be a sequence having an identity less than 100%.

Meanwhile, although 'polynucleotide having a polynucleotide sequence of a predetermined SEQ ID NO' and 'polynucleotide including a polynucleotide sequence of a predetermined SEQ ID NO' are used in the present disclosure, it is obvious that any polynucleotide having a polynucleotide sequence including deletion, modification, substitution, or addition of one or several nucleotides may also be used in the present disclosure, as long as the polynucleotide has activity identical or equivalent to that of the polynucleotide consisting of the polynucleotide sequence of the predetermined SEQ ID NO.

For example, it is obvious that any polynucleotide including addition of a meaningless sequence inside or at an end of the polynucleotide sequence of the predetermined SEQ ID NO or deletion of a part of the polynucleotide sequence of the predetermined SEQ ID NO inside or at an end thereof may also be within the scope of the present disclosure, as long as the polynucleotide has activity identical or equivalent to that of the polynucleotide of the present disclosure.

The homology and identity refer to degrees of relevance between two given polynucleotide sequences and may be expressed as a percentage.

The terms homology and identity may often be used interchangeably.

Sequence homology or identity of conserved polynucleotides may be determined by a standard alignment algorithm, and default gap penalties established by a program may be used together therewith. Substantially, homologous or identical sequences may hybridize with each other for at least about 50%, 60%, 70%, 80%, or 90% of the entire sequence or the entire length under moderate or highly stringent conditions. In a hybridized polynucleotide, a polynucleotide including a degenerate codon instead of a codon may also be considered.

The sequence homology, similarity, or identity between two given polynucleotide sequences may be determined using any known computer algorithm such as the "FASTA" program by using default parameters as introduced by, for example, Pearson et al. (1988, *Proc. Natl. Acad. Sci. USA* 85:2444). Alternatively, the Needleman-Wunsch algorithm (1970, *J. Mol. Biol.* 48:443-453) performed via the Needleman program of The European Molecular Biology Open Software Suite (EMBOSS) package (Rice et al., 2000, *Trends Genet.* 16:276-277) (version 5.0.0 or later) may be used to determine the same (including the GCG program package (Devereux, J. et al., *Nucleic Acids Research* 12:387 (1984)), BLASTP, BLASTN, FASTA (Atschul, S. F. et al., *J Molec Biol* 215:403 (1990); *Guide to Huge Computers*, Martin J. Bishop, ed., Academic Press, San Diego, 1994; and Carillo et al. (1988) *SIAM J Applied Math* 48:1073). For example, the homology, similarity, or identity may be determined using BLAST, from The National Center for Biotechnology Information database, or ClustalW.

The homology, similarity, or identity between polynucleotides may be determined by comparing sequence information using a GAP computer program, such as a program introduced by Needleman et al. (1970), *J Mol Biol.* 48:443 as disclosed in Smith and Waterman, *Adv. Appl. Math* (1981) 2:482. In brief, the GAP program defines similarity as the number of aligned symbols (i.e., nucleotides or amino acids) which are similar, divided by the total number of symbols in the shorter of two sequences. Default parameters for the GAP program may include: (1) a binary comparison matrix (containing a value of 1 for identity and 0 for non-identity) and a weighted comparison matrix of Gribskov et al. (1986) *Nucl. Acids Res.* 14:6745 disclosed in Schwartz and Dayhoff, eds., *Atlas Of Protein Sequence And Structure*, National Biomedical Research Foundation, pp. 353-358 (1979) (or EDNAFULL (EMBOSS version of NCBI NUC4.4) substitution matrix); (2) a penalty of 3.0 for each gap and an additional 0.10 penalty for each symbol in each gap (or a gap open penalty of 10, and a gap extension penalty of 0.5); and (3) no penalty for end gaps. Therefore, as used herein, the term "homology" or "identity" indicates a relatedness between sequences.

In addition, the polynucleotide may include any probe prepared from any known gene sequences, e.g., a polynucleotide sequence hybridized with a sequence totally or partly complementary to the above-described polynucleotide sequence under stringent conditions and having the same activity, without limitation. The term "stringent conditions" refers to conditions allowing specific hybridization between polynucleotides. Such conditions are disclosed in detail in known documents (for example, J. Sambrook et al., *Molecular Cloning, A Laboratory Manual*, $2^{nd}$ Edition, Cold Spring Harbor Laboratory press, Cold Spring Harbor, New York, 1989; F. M. Ausubel et al., *Current Protocols in Molecular Biology*, John Wiley & Sons, Inc., New York). For example, the stringent conditions may include performing hybridization between genes having a high homology or identity, e.g., a homology or identity of 40% or specifically 70% or more, 80% or more, 85% or more, or 90% or more, more specifically 95% or more, even more specifically 97% or more, and most specifically 99% or more, without performing hybridization between genes having a homology or identity lower than the above homologies or identities, or washing once, specifically twice or three times, under conventional washing conditions for Southern hybridization at a salt concentration and temperature of 60° C., 1×SSC, and 0.1% SDS, specifically 60° C., 0.1×SSC, 0.1% SDS, and more specifically 68° C., 0.1×SSC, and 0.1% SDS.

Hybridization requires that two polynucleotides have complementary sequences, although base mismatch may occur according to the degree of stringency of hybridization. The term "complementary" is used to describe the relationship between bases of nucleotides capable of hybridizing with each other. For example, with respect to DNA, adenosine is complementary to thymine, and cytosine is complementary to guanine. Thus, the present disclosure may include not only a substantially similar nucleic acid sequence but also a nucleic acid fragment which is isolated but complementary to the entire sequence.

Specifically, the polynucleotides having homology or identity may be detected using the above-described hybridization conditions including a hybridization process at a $T_m$ value of 55° C. Also, the $T_m$ value may be, but is not limited to, 60° C., 63° C., or 65° C., and may be appropriately adjusted by those skilled in the art according to the intended purposes.

An appropriate degree of stringency for hybridization of polynucleotides may depend on lengths and a degree of complementarity of the polynucleotides, and parameters thereof are well known in the art (Sambrook et al., supra, 9.50-9.51, 11.7-11.8).

The polynucleotide having promoter activity provided by the present disclosure may have enhanced promoter activity by substitution of a nucleotide at a particular position of the above-described polynucleotide sequence having promoter activity.

In an embodiment, the polynucleotide having promoter activity of the present disclosure may include a polynucleotide having promoter activity in which at least one nucleotide of the nucleotide sequence of SEQ ID NO: 1 or 2 is substituted with a different nucleotide. Specifically, the polynucleotide may consist of a polynucleotide having promoter activity in which at least one nucleotide of the nucleotide sequence of SEQ ID NO: 1 or 2 is substituted with a different nucleotide. The polynucleotide having promoter activity may be used interchangeably with "mutant promoter" in the present disclosure. The mutant promoter may be a promoter in which a nucleotide is substituted with a different nucleotide at one or more positions, two or more positions, three or more positions, four or more positions, five or more positions, or all six positions, or positions corresponding thereto.

In an embodiment, the polynucleotide having promoter activity may be a polynucleotide including the polynucleotide sequence of SEQ ID NO: 1 or 2 in which at least one nucleotide selected from the group consisting of the $92^{nd}$, $94^{th}$, $102^{nd}$, $103^{rd}$, $249^{th}$, and $251^{st}$ nucleotides is substituted with a different nucleotide and which has promoter activity.

The "different nucleotide" is not particularly limited as long as the nucleotide after substitution is different from that before substitution. For example, when the $92^{nd}$ nucleotide includes thymine (T) in the polynucleotide sequence of SEQ ID NO: 1, the expression "the $92^{nd}$ nucleotide of SEQ ID NO: 1 is substituted with a different nucleotide" means that thymine (T) is substituted with cytosine (C), adenine (A), or guanine (G) other than thymine (T). In the present disclosure, when a nucleotide is "substituted", the nucleotide is substituted with another nucleotide different from that before substitution unless stated otherwise.

Meanwhile, those having ordinary skill in the art would determine nucleotides at positions corresponding to the $92^{nd}$, $94^{th}$, $102^{nd}$, $103^{rd}$, $249^{th}$, and $251^{st}$ nucleotides of the polynucleotide sequence of SEQ ID NO: 1 or 2 of the present disclosure in an arbitrary polynucleotide sequence by sequence alignment well known in the art, and it would be obvious that the expression "a nucleotide at a specific position of a particular SEQ ID NO:" includes "a nucleotide at a position corresponding thereto" in an arbitrary polynucleotide sequence unless stated otherwise in the present disclosure. Therefore, any polynucleotide sequence of a polynucleotide having promoter activity, in which at least one nucleotide selected from the group consisting of nucleotides corresponding to the $92^{nd}$, $94^{th}$, $102^{nd}$, $103^{rd}$, $249^{th}$, and $251^{st}$ nucleotides of the polynucleotide sequence of SEQ ID NO: 1 or 2 is substituted with a different nucleotide, is within the scope of the present disclosure.

The "$92^{nd}$, $94^{th}$, $102^{nd}$, $103^{rd}$, $249^{th}$, and $251^{st}$ positions of SEQ ID NO: 1 or 2" are located respectively at 409 nt, 407 nt, 399 nt, 398 nt, 252 nt, and 250 nt upstream from A, as a reference (0), of ATG, which is an initiation codon, in polynucleotides having promoter activity derived from Saccharomyces cerevisiae strains CEN KSD-Yc, YJM1450, YJM1401, YJM1307, and a strain deposited under the Budapest Treaty to the Korean Culture Center of Microorganisms (KCCM) with Accession No. KCCM12568P, i.e., in SEQ ID NO: 2, and thus the positions may be stated as the $-409^{th}$, $-407^{th}$, $-399^{th}$, $-398^{th}$, $-252^{nd}$, and $-250^{th}$ positions, respectively, upstream from the ORF according to a method commonly used in the art.

Meanwhile, with respect to the polynucleotide having promoter activity derived from Saccharomyces cerevisiae CEN.PK1-D, i.e., SEQ ID NO: 1, in which the nucleotide at the $74^{th}$ position upstream from the ORF (i.e., $-74^{th}$ position) is deleted in the promoter sequence of Saccharomyces cerevisiae CEN KSD-Yc, the "$92^{nd}$, $94^{th}$, $102^{nd}$, $103^{rd}$, $249^{th}$, and $251^{st}$ positions of SEQ ID NO: 1 or 2" correspond to the $-408^{th}$, $-406^{th}$, $-398^{th}$, $-397^{th}$, $-251^{st}$, and $-249^{th}$ positions upstream from the ORF, respectively.

In an embodiment, the polynucleotide having promoter activity of the present disclosure may be a polynucleotide in which at least one nucleotide selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 is substituted with a different nucleotide.

Specifically, in the present disclosure, the polynucleotide having promoter activity may be a polynucleotide in which two or more nucleotides selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 are substituted with different nucleotides.

Specifically, in the present disclosure, the polynucleotide having promoter activity may be a polynucleotide in which four or more nucleotides selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 are substituted with different nucleotides.

Specifically, the polynucleotide may be a polynucleotide in which all of the six nucleotides selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 are substituted with different nucleotides.

In an embodiment of the present disclosure, the polynucleotide having promoter activity may be a polynucleotide in which the 249th and 251st nucleotides of the polynucleotide sequence of SEQ ID NO: 1 or 2 are substituted with different nucleotides.

In an embodiment of the present disclosure, the polynucleotide having promoter activity may be a polynucleotide in which the 92nd, 94th, 102nd, and 103rd nucleotides of the polynucleotide sequence of SEQ ID NO: 1 or 2 are substituted with different nucleotides.

However, the present disclosure is not limited thereto.

In an embodiment of the present disclosure, the polynucleotide having promoter activity may include:
  substitution of thymine (T) at the 92nd position with guanine (G), cytosine (C), or adenine (A);
  substitution of thymine (T) at the 94th position with guanine (G), cytosine (C), or adenine (A);
  substitution of adenine (A) at the 102nd position with guanine (G), cytosine (C), or thymine (T);
  substitution of adenine (A) at the 103rd position with guanine (G), cytosine (C), or thymine (T);
  substitution of guanine (G) at the 249th position with thymine (T), cytosine (C), or adenine (A);
  substitution of cytosine (C) at the 251st position with thymine (T), guanine (G), or adenine (A); or any combination thereof in the polynucleotide sequence of SEQ ID NO: 1 or 2.

In an embodiment, thymine (T) at the 92nd position may be substituted with cytosine (C). This may also be stated as 92 (T→C) or −409 (T→C), and according to a reference sequence, as −408 (T→C).

In an embodiment, thymine (T) at the 94th position may be substituted with cytosine (C). This may also be stated as 94 (T→C) or −407 (T→C), and according to a reference sequence, as −406 (T→C).

In an embodiment, adenine (A) at the 102nd position may be substituted with cytosine (C). This may also be stated as 102 (A→C) or −399 (A→C), and according to a reference sequence, as −398 (A→C).

In an embodiment, adenine (A) at the 103rd position may be substituted with thymine (T). This may also be stated as 103 (A→T) or −398 (A→T), and according to a reference sequence, as −397 (A→T).

In an embodiment, guanine (G) at the 249th position may be substituted with adenine (A). This may also be stated as 249 (G→A) or −252 (G→A), and according to a reference sequence, as −251 (G→A).

In an embodiment, cytosine (C) at the 251st position may be substituted with thymine (T). This may also be stated as 251 (C→T) or −250 (C→T), and according to a reference sequence, as −249 (C→T).

In an embodiment of the present disclosure, the polynucleotide having promoter activity may include at least one of the substitutions of 92 (T→C), 94 (T→C), 102 (A→C), 103 (A→T), 249 (G→A), and 251 (C→T).

In an embodiment of the present disclosure, the polynucleotide having promoter activity may include substitutions of 249 (G→A) and 251 (C→T).

In an embodiment of the present disclosure, the polynucleotide having promoter activity may include substitutions of 92 (T→C), 94 (T→C), 102 (A→C), and 103 (A→T).

In an embodiment of the present disclosure, the polynucleotide having promoter activity may include all substitutions of 92 (T→C), 94 (T→C), 102 (A→C), 103 (A→T), 249 (G→A), and 251 (C→T).

In an embodiment of the present disclosure, the polynucleotide having promoter activity may include at least one polynucleotide sequence selected from SEQ ID NOS: 3 to 32. Specifically, the polynucleotide may consist of one polynucleotide sequence selected from SEQ ID NOS: 3 to 32, without being limited thereto.

As described above, although the expressions 'polynucleotide having a nucleotide sequence of a particular SEQ ID NO:' or 'polynucleotide including a nucleotide sequence of a particular SEQ ID NO:' is used in the present disclosure, it is obvious that any polynucleotide having a nucleotide sequence including deletion, modification, substitution, or addition of one or several nucleotides may also be used in the present disclosure as long as the polynucleotide has activity identical or equivalent to that of the polynucleotide consisting of the nucleotide sequence of the particular SEQ ID NO.

In addition, the present disclosure is not limited to the aforementioned embodiments, and the polynucleotide sequence may include various modifications within a range that does not significantly impair promoter activity.

The polynucleotide having promoter activity of the present disclosure may be used as a promoter.

The promoter may be located at a 5' region of an initiation site of mRNA transcription.

The promoter may have enhanced promoter activity compared to conventional promoters. That is, the promoter may increase not only expression of a target gene in host cells, but also expression and/or activity of a protein encoded by the target gene. In view of the objects of the present disclosure, a target gene for enhancing expression may be modified according to a product to obtain, and the promoter may be used as a general-use promoter to enhance a target gene.

The "target gene" refers to a gene, expression of which is to be regulated by the promoter sequence of the present disclosure in view of the objects of the present disclosure. A protein encoded by the target gene may be referred to as a "target protein", and a gene encoding the "target protein" may be referred to as a "target gene".

In addition, the polynucleotide encoding the target protein may have various modifications made in a coding region provided not to change an amino acid sequence of the protein expressed from the coding region due to codon degeneracy or in consideration of codons preferred by a living organism in which the polynucleotide is expressed. Descriptions of the polynucleotide sequence are as provided above.

In an embodiment, the target protein may be a polypeptide having glutamate-cysteine ligase activity. That is, the target gene of the promoter may be a gene encoding a polypeptide having the glutamate-cysteine ligase.

In the present disclosure, the "glutamate-cysteine ligase" is an enzyme also referred to as "glutamate-cysteine linking enzyme", "gamma-glutamyl cysteine synthetase (GCS)", or "GSH1 protein".

The glutamate-cysteine ligase is known to catalyze the following reaction:

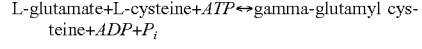

Also, the reaction catalyzed by the glutamate-cysteine ligase is known as a first step of glutathione synthesis.

An amino acid sequence constituting the glutamate-cysteine ligase may be obtained from the known database of NCBI GenBank. For example, the glutamate-cysteine ligase may be derived from *Saccharomyces cerevisiae*. For example, the glutamate-cysteine ligase may be a protein including an amino acid sequence of SEQ ID NO: 33, but may include any sequence having the same activity as the amino acid sequence, without limitation.

In addition, the "polypeptide having glutamate-cysteine ligase activity" of the present disclosure may include not only a wild-type, non-modified, or naturally occurring form of the glutamate-cysteine ligase, but also variants having the same or enhanced glutamate-cysteine ligase activity.

In the present disclosure, a "modified polypeptide", having the same meaning as "variant", may refer to a protein obtained by conservative substitution and/or modification of at least one amino acid different from that of the recited sequence while retaining functions or properties of the protein. For example, the modified polypeptide may be a variant in which an amino acid at the $86^{th}$ position from the N-terminus of SEQ ID NO: 33 is substituted with a different amino acid residue other than cysteine in the above-described glutamate-cysteine ligase.

The variant is different from the sequence identified by substitution, deletion, or addition of several amino acids. Such variants may be obtained by modifying one or more amino acids in the above amino acid sequence of the protein and identified by evaluating properties of the modified protein. That is, the ability of the variant may be enhanced relative to a native protein. In addition, some variants may include variants from which at least one portion such as an N-terminal leader sequence or a transmembrane domain have been removed. Other variants may include variants in which a portion has been removed from the N- and/or C-terminus of a mature protein.

The term "variant" may also be used interchangeably with other terms such as modification, modified protein, modified polypeptide, mutant, mutein, and divergent, and any terms used to indicate variation may also be used without limitation. In view of the objects of the present disclosure, the variant may have enhanced activity compared to wild-type or non-modified proteins, without being limited thereto.

As used herein, the term "conservative substitution" refers to substitution of one amino acid with a different amino acid having similar structural and/or chemical properties. The variant may have at least one conservative substitution while retaining at least one biological activity. Such amino acid substitution may generally occur based on similarity of the polarity, charge, solubility, hydrophobicity, hydrophilicity, and/or amphipathic nature of a residue.

Variants may also include deletion or addition of amino acids that have minimal influence on properties and a secondary structure of a polypeptide. For example, the polypeptide may be conjugated to a signal (or leader) sequence at the N-terminus of a protein which co-translationally or post-translationally directs transfer of the protein. The polypeptide may also be conjugated with another sequence or linker to identify, purify, or synthesize the polypeptide.

In the present disclosure, the "substituted with a different amino acid" is not particularly limited as long as the amino acid after substitution is different from the amino acid before substitution. That is, substitution of cysteine, which is the $86^{th}$ amino acid from the N-terminus of the amino acid sequence of SEQ ID NO: 33, with an amino acid other than cysteine may also be expressed as "substation of the $86^{th}$ amino acid with a different amino acid". Meanwhile, in the present disclosure, it is obvious that the expression "a predetermined amino acid is substituted" means that the amino acid after substitution is different from the amino acid before substitution unless the expression "substituted with a different amino acid" is used.

The "glutamate-cysteine ligase variant" of the present disclosure may also be referred to as "a (modified) polypeptide having glutamate-cysteine ligase activity" or "GSH1 variant" which may increase glutathione production compared to a protein before modification, a wild-type polypeptide, or a non-modified polypeptide, without being limited thereto.

In the variant, at least one amino acid of the amino acid sequence of SEQ ID NO: 33 may be substituted with a different amino acid. Specifically, the variant may include substitution of an amino acid corresponding to the $86^{th}$ position of the amino acid sequence of SEQ ID NO: 33 with a different amino acid. The different amino acid may be selected from glycine, alanine, valine, leucine, isoleucine, methionine, phenylalanine, tryptophan, proline, serine, threonine, tyrosine, asparagine, glutamate, glutamine, aspartate, lysine, arginine, and histidine.

In an embodiment, the amino acid corresponding to the $86^{th}$ position of the amino acid sequence of SEQ ID NO: 33 may be substituted with arginine, without being limited thereto.

In the present disclosure, it is obvious that the "variant in which the $86^{th}$ amino acid from the N-terminus of the amino acid sequence of SEQ ID NO: 33 is substituted with a different amino acid" includes a variant in which an amino acid corresponding to the $86^{th}$ position of the amino acid sequence of SEQ ID NO: 33 is substituted with a different amino acid, although the amino acid is at a position other than the $86^{th}$ position due to deletion/addition/addition or the like of an amino acid at the N- or C-terminus or in the middle of the amino acid sequence of SEQ ID NO: 33. Also, although the variant, in which the $86^{th}$ amino acid from the N-terminus of the amino acid sequence of SEQ ID NO: 33 is substituted with a different amino acid, is disclosed as an example of the glutamate-cysteine ligase variant of the present disclosure, it is obvious that the glutamate-cysteine ligase variant of the present disclosure is not limited to the variant of the amino acid sequence of SEQ ID NO: 33, and a variant in which the amino acid corresponding to the $86^{th}$ position of the amino acid sequence of SEQ ID NO: 33 is substituted with a different amino acid in any amino acid sequence having the activity of the glutamate-cysteine ligase is also within the scope of the glutamate-cysteine ligase variant of the present disclosure. In any amino acid sequence, the "amino acid corresponding to the $86^{th}$ position of the amino acid sequence of SEQ ID NO: 33" may be identified by various sequence alignment methods well known in the art.

The glutamate-cysteine ligase variant of the present disclosure in which the amino acid corresponding to the $86^{th}$ position from the N-terminus of the amino acid sequence of SEQ ID NO: 33 is substituted with a different amino acid may be a protein including the amino acid sequence of SEQ ID NO: 33 or an amino acid sequence having at least 80%, 85%, 90%, 95%, 96%, 97%, 98%, or 99% homology or identity therewith. Also, it is obvious that any protein having the amino acid sequence including deletion, modification, substitution, or addition of one or several amino acids at a position other than the $86^{th}$ position is within the scope of the present disclosure as long as the protein retains the above-described homology or identity and an effect equivalent to that of the variant. Homology and identity are as described above.

A gene encoding the polypeptide having glutamate-cysteine ligase activity of the present disclosure may be referred to as "GSH1 gene".

The gene may be derived from yeast. Specifically, the gene may be derived from a microorganism belonging to the genus *Saccharomyces*, more specifically *Saccharomyces cerevisiae*. Specifically, the gene may be a gene encoding the amino acid sequence of SEQ ID NO: 33, but is not limited thereto.

In the present disclosure, the "GSH1 gene", i.e., the polynucleotide encoding the polypeptide having glutamate-cysteine ligase activity, may have various modifications made in a coding region provided not to change an amino acid sequence of the polypeptide expressed from the coding region due to codon degeneracy or in consideration of codons preferred by a living organism in which the polynucleotide is expressed.

Since the polypeptide having glutamate-cysteine ligase activity of the present disclosure also includes sequences of variants, any polynucleotide sequences encoding protein variants in which the amino acid at the $86^{th}$ position of the amino acid sequence of SEQ ID NO: 33 of the present disclosure is substituted with a different amino acid may also be included without limitation.

In addition, the polynucleotide may include a polynucleotide sequence that is hybridized with a probe constructed using a known gene sequence, e.g., a polynucleotide sequence entirely or partly complementary to the polynucleotide sequence under stringent conditions to encode the protein variant, in which the amino acid corresponding to the $86^{th}$ position of the amino acid sequence of SEQ ID NO: 33 is substituted with a different amino acid, without limitation.

Another aspect of the present disclosure provides a composition for expressing a gene including the polynucleotide having promoter activity of the present disclosure.

The composition for expressing a gene refers to a composition capable of expressing the gene using the polynucleotide having promoter activity of the present disclosure.

For example, the composition for expressing a gene includes the polynucleotide having promoter activity of the present disclosure, and may further include any other components capable of operating the polynucleotide as a promoter.

In the composition for expressing a gene according to the present disclosure, the polynucleotide may be in a form included in a vector enabling expression of the gene operably linked thereto in a host cell.

Another aspect of the present disclosure provides a vector including either the polynucleotide having promoter activity or the polynucleotide and a gene encoding a target protein.

In an embodiment, the target protein may be a polypeptide having glutamate-cysteine ligase activity.

As used herein, the term "vector" refers to a DNA construct including a polynucleotide sequence encoding a target protein, which is operably linked to an appropriate regulatory sequence to express the target protein in a suitable host cell.

In view of the objects of the present disclosure, the regulatory sequence may include the polynucleotide having promoter activity of the present disclosure.

Meanwhile, the regulatory sequence may include a promoter for initiating transcription, an operator sequence for regulating the transcription, a sequence encoding a suitable mRNA ribosome binding site, and a sequence regulating termination of transcription and translation. After the vector is introduced into the suitable host cell, it may replicate or function independently of the host genome and may be integrated into the genome.

The vector used in the present disclosure is not particularly limited, and any vector known in the art may be used. As a vector expressed in yeast, both integrative yeast plasmids (YIp) and extrachromosomal plasmid vectors may be used.

The extrachromosomal plasmid vector may include episomal yeast plasmids (YEp), replicative yeast plasmids (YRp), and yeast centromer plasmids (YCp).

Also, artificial yeast chromosomes (YACs) may also be used as the vector of the present disclosure.

As a specific example, available vectors may include pESCHIS, pESC-LEU, pESC-TRP, pESC-URA, Gateway pYES-DEST52, pAO815, pGAPZ A, pGAPZ B, pGAPZ C, pGAPα A, pGAPα B, pGAPα C, pPIC3.5K, pPIC6 A, pPIC6 B, pPIC6 C, pPIC6α A, pPIC6α B, pPIC6α C, pPIC9K, pYC2/CT, pYD1 Yeast Display Vector, pYES2, pYES2/CT, pYES2/NT A, pYES2/NT B, pYES2/NT C, pYES2/CT, pYES2.1, pYES-DEST52, pTEF1/Zeo, pFLD1, PichiaPink™, p427-TEF, p417-CYC, pGAL-MF, p427-TEF, p417-CYC, PTEF-MF, pBY011, pSGP47, pSGP46, pSGP36, pSGP40, ZM552, pAG303GAL-ccdB, pAG414GAL-ccdB, pAS404, pBridge, pGAD-GH, pGAD T7, pGBK T7, pHIS-2, pOBD2, pRS408, pRS410, pRS418, pRS420, pRS428, yeast micron A form, pRS403, pRS404, pRS405, pRS406, pYJ403, pYJ404, pYJ405, and pYJ406, without being limited thereto.

The insertion of the polynucleotide into the chromosome may be performed by any method known in the art, for example, homologous recombination, without being limited thereto. A selection marker may be further included to confirm chromosomal insertion. The selection marker is used to select cells that are transformed with the vector, that is, to identify insertion of a desired nucleic acid molecule, and examples of the selection marker may include markers providing selectable phenotypes, such as drug resistance, nutrient requirement, resistance to cytotoxic agents, or surface expression of variant polypeptide. Only cells expressing the selection marker are able to survive or to show different phenotypes under the environment treated with a selective agent, and thus the transformed cells may be selected. For example, a wild-type polynucleotide may be replaced with a mutant polynucleotide by using a vector for chromosomal insertion in cells.

As used herein, the term "transformation" refers to a process for inserting a vector including a polynucleotide encoding a target protein into a host cell so as to be able to express the target protein in the host cell.

The transformed polynucleotide may be either in a form inserted into the chromosome of the host cell or in a form located outside the chromosome as long as the protein is expressed in the host cell. In addition, the polynucleotide encoding the target protein may include DNA and RNA encoding the target protein. The polynucleotide encoding the target protein may be introduced into the host cell in any form as long as the polynucleotide is introduced into the host cell and the protein is expressed therein. For example, the polynucleotide encoding the target protein may be introduced into the host cell in the form of an expression cassette, which is a gene construct including all of the essential elements required for self-replication.

The expression cassette may generally include a promoter operably linked to the polynucleotide encoding the target protein, a transcription termination signal, a ribosome binding site, and a translation termination signal. The expression cassette may be in the form of a self-replicable expression vector. Also, the polynucleotide encoding the target protein may be introduced into the host cell in its original form and operably linked to a sequence required for the expression in the host cell, without being limited thereto.

In addition, as used herein, the term "operably linked" means that the polynucleotide sequence encoding the target protein of the present disclosure is functionally linked to a promoter sequence which initiates and mediates transcription of the polynucleotide sequence.

In view of the objects of the present disclosure, the promoter may be a polynucleotide having promoter activity of the present disclosure.

Methods for the transformation according to the present disclosure include any methods enabling introduction of the vector into the host cell, and may be performed by suitable standard techniques well known in the art selected in accordance with the host cell. For example, electroporation, calcium phosphate ($CaPO_4$) precipitation, calcium chloride ($CaCl_2$) precipitation, microinjection, a polyethylene glycol (PEG) method, a DEAE—dextran method, a cationic liposome method, and a lithium acetate—DMSO method may be used, but the present disclosure is not limited thereto.

Another aspect of the present disclosure provides a microorganism including the polynucleotide having promoter activity of the present disclosure, a polynucleotide including the above-described polynucleotide and a gene encoding a target protein, or a vector including the same.

The target protein may be a polypeptide having glutamate-cysteine ligase activity. The polynucleotide having promoter activity of the present disclosure, the target protein, the polypeptide having glutamate-cysteine ligase activity, and the vector are as described above.

The microorganism may be yeast, specifically a microorganism belonging to the genus *Saccharomyces* sp., and more specifically *Saccharomyces cerevisiae*.

The microorganism may be a microorganism expressing glutamate-cysteine ligase, a microorganism expressing a polypeptide having glutamate-cysteine ligase activity, or a microorganism into which a polypeptide having glutamate-cysteine ligase activity is introduced, without being limited thereto.

In an embodiment, the microorganism may be a microorganism having the ability to produce glutathione, a microorganism prepared by enhancing the ability to produce glutathione in a parent strain naturally having a low ability to produce glutathione, or a microorganism prepared by providing the ability to produce glutathione to a parent strain unable to produce glutathione. In an embodiment, the microorganism may be a microorganism expressing the glutamate-cysteine ligase variant including at least one amino acid variation in the amino acid sequence of SEQ ID NO: 33, and the amino acid variation may include substitution of the $86^{th}$ amino acid from the N-terminus of SEQ ID NO: 33 with a different amino acid. However, the present disclosure is not limited thereto. The glutamate-cysteine ligase variant is as described above.

As used herein, the term a protein "to be expressed/expressed" means a state in which a target protein, e.g., glutamate-cysteine ligase or a variant thereof, is introduced into or modified to be expressed in a microorganism. In the case where the protein is present in the microorganism, the activity of the protein is enhanced compared to the activity of the endogenous protein thereof or that before modification.

Specifically, the term "introduction of a protein" refers to providing activity of a particular protein to a microorganism which does not possess the protein or enhancing the activity of the protein compared to the intrinsic activity of the protein or the activity before modification. For example, the introduction of a protein may refer to introduction of a polynucleotide encoding the protein into a chromosome or introduction of a vector including the polynucleotide encoding the particular protein into a microorganism to thereby express the activity of the protein.

In addition, the "enhancement of activity" may mean that the activity of a particular protein of a microorganism is enhanced when compared with the intrinsic activity or the activity before modification. The term "intrinsic activity" may refer to activity of a particular protein possessed by a parent strain before transformation when a microorganism is transformed by natural or artificial genetic variation.

In view of the objects of the present disclosure, the enhancement of activity may be achieved by using the polynucleotide sequence having promoter activity of the present disclosure as an expression regulatory sequence of the target protein. The target protein may be a wild-type or a variant as described above, the expression regulatory sequence may be an expression regulatory sequence of a gene encoding a protein variant or an expression regulatory sequence of a chromosomal gene encoding a wild-type protein.

In addition, any other methods for enhancing activity or a combined method may be used. For example, in addition to the method of using the polynucleotide sequence having promoter activity of the present disclosure as an expression regulatory sequence of the target protein, at least one method selected from the group consisting of a method of increasing the copy number of a gene encoding the target protein in cells, a method of replacing a chromosomal gene encoding a wild-type protein with a gene encoding a protein variant, a method of additionally introducing a mutation into the gene encoding the gene encoding the protein to enhance activity of the protein variant, and a method of introducing the protein variant into a microorganism may be used, without being limited thereto.

The activity of the target protein may be enhanced by using the polynucleotide having the promoter activity of the present disclosure as an expression regulatory sequence of the target protein in a microorganism.

For example, the activity or concentration of the protein may generally be increased by a minimum of 1%, 10%, 25%, 50%, 75%, 100%, 150%, 200%, 300%, 400%, or 500% to a maximum of 1000% or 2000%, compared to the activity or concentration of a wild-type or non-modified microorganism strain, without being limited thereto.

As used herein, the term "non-modified microorganism" does not exclude strains having mutation that may occur naturally in microorganisms, and may be a wild-type strain, a microorganism not including the polynucleotide having promoter activity of the present disclosure, or a microorganism not transformed with a vector including the polynucleotide having promoter activity of the present disclosure.

The microorganism of the present disclosure may be a glutathione-producing microorganism.

As used herein, the term "glutathione" may be used interchangeably with "GSH" and refers to a tripeptide compound consisting of three amino acids: glutamate, cysteine, and glycine. Glutathione may be used as a raw material for pharmaceuticals, health functional foods, taste ingredients, food and feed additives, cosmetics, and the like, but is not limited thereto.

As used herein, the term "glutathione-producing microorganism" includes microorganisms in which natural or artificial genetic modification occurs, and may refer to a microorganism having a particular mechanism weakened or enhanced via introduction of an exogenous gene or enhancement or inactivation of an endogenous gene by genetic modification in order to produce glutathione. In view of the objects of the present disclosure, the glutathione-producing microorganism may refer to a microorganism including the polynucleotide having promoter activity of the present disclosure and capable of producing a large amount of target glutathione compared to wild-type or non-modified microorganisms.

The "glutathione-producing microorganism" may be used interchangeably with "microorganism producing glutathione", "microorganism having the ability to produce glutathione, "glutathione-producing strain", "strain having the ability to produce glutathione", or the like.

The glutathione-producing microorganism may be a recombinant microorganism. The recombinant microorganism is as described above. The microorganism may include mutation for enhancement of a biosynthetic pathway for increasing glutathione producing ability, release of feedback inhibition, or inactivation of genes that weaken the degradation pathway or biosynthetic pathway, and such mutation may be due to an artificial method, e.g., UV irradiation, and does not exclude naturally occurring mutation.

Another aspect of the present disclosure provides a method of producing glutathione, the method including culturing the microorganism in a culture medium. The microorganism and glutathione are as described above. Glutathione may be accumulated in the microorganism by strain cultivation.

With regard to a culture medium used to culture the strain of the present disclosure or other culturing conditions, any culture media commonly used to culture microorganisms belonging to the genus *Saccharomyces* may be used without limitation, and specifically, the strain of the present disclosure may be cultured in an ordinary medium containing appropriate carbon sources, nitrogen sources, phosphorus sources, inorganic compounds, amino acids, and/or vitamins under aerobic or anaerobic conditions while adjusting temperature, pH, and the like.

In the present disclosure, as the carbon sources, carbohydrates such as glucose, fructose, sucrose, and maltose; sugar alcohols such as mannitol and sorbitol; organic acids such as pyruvic acid, lactic acid, and citric acid; and amino acids such as glutamate, methionine, and lysine may be used, without being limited thereto. In addition, natural organic nutrients such as starch hydrolysates, molasses, blackstrap molasses, rice bran, cassava, sugar cane bagasse, and corn steep liquor may be used, and carbohydrates such as glucose and sterile pretreated molasses (i.e., molasses converted to reduced sugars) may be used, and suitable amounts of any other carbon sources may also be used without limitation. These carbon sources may be used alone or in a combination of at least two thereof.

As the nitrogen sources, inorganic nitrogen sources such as ammonia, ammonium sulfate, ammonium chloride, ammonium acetate, ammonium phosphate, ammonium carbonate, and ammonium nitrate; and organic nitrogen sources such as amino acids, peptone, NZ-amine, meat extract, yeast extract, malt extract, corn steep liquor, casein hydrolysate, fish or degradation products thereof, and defatted soybean cake or degradation products thereof may be used. These nitrogen sources may be used alone or in a combination of at least two thereof.

As the phosphorus sources, monopotassium phosphate, dipotassium phosphate, or sodium-containing salts corresponding thereto may be used. As the inorganic compounds, sodium chloride, calcium chloride, iron chloride, magnesium sulfate, iron sulfate, manganese sulfate, calcium carbonate, and the like may be used.

The culture medium may further include amino acids, vitamins, and/or suitable precursors. Specifically, L-amino acids or the like may be added to the culture medium for the strain. Specifically, glycine, glutamate, and/or cysteine may be added to the culture medium, and L-amino acids such as lysine may further be added thereto, if required, but the present disclosure is not limited thereto.

The culture medium and precursors may be added to cultures in a batch or continuous process, without being limited thereto.

In the present disclosure, during the culturing process of the strain, compounds such as ammonium hydroxide, potassium hydroxide, ammonia, phosphoric acid, and sulfuric acid may be properly added to the cultures in order to adjust the pH of the cultures. Also, a defoaming agent such as fatty acid polyglycol ester may be added in order to inhibit formation of foam during culturing. In addition, oxygen or oxygen-containing gas may be injected into the cultures to keep the cultures in an aerobic condition, and nitrogen, hydrogen, or carbon dioxide gas may be injected into the cultures to keep the culture in anaerobic and micro-aerobic conditions without injecting any other gases therefor.

The temperature of the cultures may be maintained at 25° C. to 40° C., more specifically at 28° C. to 37° C., without being limited thereto. The culturing may be continued until a desired amount of a product is obtained, specifically for 1 hour to 100 hours, without being limited thereto.

The method of producing glutathione may further include an additional process after the culturing step. The additional process may appropriately be selected in accordance with the purpose of use of glutathione.

Specifically, the method of producing glutathione may further include recovering glutathione from at least one selected from the cultured microorganism, a dried product of the microorganism, an extract of the microorganism, a culture product of the microorganism, and a lysate of the microorganism, after the culturing step.

The method may further include lysing the microorganism (strain) before or simultaneously with the recovering step. The lysing of the strain may be performed by way of any method commonly used in the art to which the present disclosure pertains, e.g., by heat treatment or by using a buffer solution for lysis, a sonicator, and a French press. Also, the lysing step may include enzymatic reaction by cell wall lytic enzyme, nuclease, transnucleotidase, protease, or the like, without being limited thereto.

In view of the objects of the present disclosure, according to the method of producing glutathione, dry yeast, yeast extract, and yeast extract mix powder, each having a high glutathione content, and pure glutathione may be prepared. However, the present disclosure is not limited thereto, and these products may be appropriately prepared according to desired products.

In the present disclosure, the dry yeast may be used interchangeably with "dried product of the microorganism", "dried product of the strain", or the like. The dry yeast may be prepared by drying the yeast strain in which glutathione is accumulated, and specifically, it may be included in a feed composition, a food composition, and the like, without being limited thereto.

In the present disclosure, the yeast extract may be used interchangeably with terms such as "extract of the microorganism", "strain extract", or the like. The strain extract may refer to substances remaining after separating cell walls from the strain. Specifically, the strain extract may refer to the components remaining after excluding the cell walls from the components obtained by lysing the cells. The strain extract includes glutathione and one or more other components selected from proteins, carbohydrates, nucleic acids, and fibers in addition to glutathione, without being limited thereto.

The recovering step may be performed using any suitable method well known in the art, and glutathione, as the target substance, may be recovered.

The recovering step may include a purification process. The purification process may be performed by isolating only glutathione from the strain. Via the purification process, pure glutathione may be prepared.

If required, the method of preparing glutathione may further include mixing an excipient with one selected from the strain, a dried product, an extract, a culture product, and a lysate thereof, and glutathione recovered therefrom. By way of the mixing step, the yeast extract mix powder may be prepared.

The excipient may be appropriately selected and used in accordance with the intended use or form, and may be, for example, selected from starch, glucose, cellulose, lactose, glycogen, D-mannitol, sorbitol, lactitol, maltodextrin, calcium carbonate, synthetic aluminum silicate, calcium monohydrogen phosphate, calcium sulfate, sodium chloride, sodium hydrogen carbonate, purified lanolin, dextrin, sodium alginate, methyl cellulose, colloidal silica gel, hydroxypropyl starch, hydroxypropylmethyl cellulose, propylene glycol, casein, calcium lactate, primojel, and gum Arabic, and specifically, it may include at least one component selected from starch, glucose, cellulose, lactose, dextrin, glycogen, D-mannitol, and maltodextrin, without being limited thereto.

The excipient may include, for example, a preservative, a humectant, a dispersant, a suspending agent, a buffer, a stabilizer, or an isotonic agent, without being limited thereto.

Another aspect of the present disclosure provides a use of a polynucleotide in which at least one nucleotide selected from the group consisting of the $92^{nd}$, $94^{th}$, $102^{nd}$, $103^{rd}$, $249^{th}$, and $251^{st}$ nucleotides of the polynucleotide sequence of SEQ ID NO: 1 or 2 is substituted with a different nucleotide, as a promoter.

The polynucleotide is as described above.

MODE FOR INVENTION

Hereinafter, the present disclosure will be described in more detail with reference to the following examples and experimental examples. However, the following examples and experimental examples are merely presented to exemplify the present disclosure, and the scope of the present disclosure is not limited thereto.

Example 1: Obtaining CJ-5 Strain Having Glutathione Producing Ability

Strains were obtained from yeast blocks containing various strains, and characteristics thereof were improved to select strains having a glutathione producing ability.

Specifically, grain samples such as rice, barley, mung beans, and oats were collected from 20 areas, such as, Hwaseong, Pyeongtaek, Yongin, and the like in Gyeonggido, Republic of Korea, then pulverized, kneaded, wrapped in a cloth, pressed firmly to form a shape, wrapped with straw for fermentation for 10 days, and slowly dried to prepare yeast blocks.

The following experiment was performed to isolate various strains from the prepared yeast blocks. 45 mL of a saline solution was added to 5 g of yeast blocks and pulverized using a mixer. In order to purely isolate a yeast strain, the resultant was diluted by serial dilution, spread on a YPD agar (10 g/L yeast extract, 20 g/L Bacto peptone, and 20 g/L glucose per 1 L of distilled water), and cultured at 30° C. for 48 hours. Then, according to the morphology of colonies and microscopic verification, colonies of the yeast were streaked on the YPD agar. 25 mL of a YPD broth was seeded in a 250 mL conical flask, and the purely isolated strain was inoculated thereonto and cultured in a shaking incubator for 48 hours at 30° C. and 200 rpm. The strains were screened by identifying glutathione production.

In order to enhance primarily isolated strains, random mutation was induced in the isolated strains. Specifically, a strain confirmed to have the glutathione producing ability was isolated from the yeast blocks and named CJ-37 strain. The CJ-37 strain was cultured in a solid medium and inoculated into a broth to obtain a culture solution thereof, and the culture solution was exposed to UV light using a UV lamp. After the culture solution exposed to UV rays was plated on a plate medium, only a mutant strain that had formed colonies was isolated, and glutathione production thereof was identified.

As a result, among the mutant strains, a strain exhibiting the largest glutathione production was selected as a glutathione-producing strain and named CJ-5 strain and deposited at the Korean Culture Center of Microorganisms (KCCM) under the Budapest Treaty and designated as Accession No. KCCM12568P on Jul. 31, 2019.

Example 2: Development of Modified Sequence of GSH1 by Experiment For Additional Enhancement of CJ-5 Strain Example 2-1: Induction of Mutation and Identification of Modified Sequence Mutation was induced in the following manner in order to further improve the glutathione producing ability of the CJ-5 strain.

The CJ-5 strain was cultured in a solid medium and inoculated onto a broth to obtain a culture solution, and the culture solution was exposed to UV light using a UV lamp. After the culture solution exposed to UV light was plated on a plate medium, only a mutant strain that had formed colonies was isolated. A strain exhibiting the greatest glutathione production was isolated and named CC02-2490 strain and deposited at the Korean Culture Center of Microorganisms (KCCM) under the Budapest Treaty and designated as Accession No. KCCM12659P on Jan. 17, 2020. As a result of analyzing the base sequence of the glutathione biosynthesis gene, GSH1, with respect to enhancement of the glutathione producing ability of the strain, it was confirmed that cysteine, which is the $86^{th}$ amino acid of the GSH1 protein encoded by the GSH1 gene, had been substituted with arginine.

Example 2-2: Experiment for Substitution of C86 Residue of GSH1 Protein

Considering that the amino acid at the $86^{th}$ position of the of the GSH1 protein is important in glutathione production based on the results of Example 2-1, mutant stains of *Saccharomyces cerevisiae* (*S. cerevisiae*) CEN.PK2-1D and *Saccharomyces cerevisiae* (*S. cerevisiae*) CJ-5 strain were prepared to express protein variants in which cysteine at the 86$^{th}$ position of the GSH1 protein was substituted with a different amino acid, and increases in glutathione production were identified.

In order to prepare strains in which cysteine at the 86$^{th}$ position of the GSH1 protein of *Saccharomyces cerevisiae* was substituted with arginine, pWAL100 and pWBR100 plasmids were used with reference to a publication of Lee T H, et al. (*J. Microbiol. Biotechnol.* (2006), 16(6), 979-982). Specifically, polymerase chain reaction (PCR) was performed as follows using genomic DNA of the CJ-5 strain as a template. A partial sequence of the N-terminus of the GSH1 protein including a N-terminal BamHI flanking sequence, a GSH1 ORF initiation codon, and a C86R mutation-encoding sequence was obtained by performing PCR using primers of SEQ ID NOS: 34 and 35, and a partial sequence of the C-terminus of the GSH1 protein including a C-terminal XhoI flanking sequence, a GSH1 ORF termination codon, and a C86R mutation-encoding sequence was obtained by performing PCR using primers of SEQ ID NOS: 36 and 37. Subsequently, as a result of performing overlap PCR using the two sequences as templates with the primers of SEQ ID NOS: 34 and 37, a GSH1 ORF fragment, including a sequence encoding a GSH1 variant in which cysteine at the 86$^{th}$ position was substituted with arginine and N-terminal BamHI and C-terminal XhoI restriction enzyme sequences, was obtained. The ORF fragment was treated with BamHI and XhoI and then cloned into a pWAL100 vector treated with the same enzymes to prepare a pWAL100-GSH1(C86R) vector.

Also, 500 bp downstream from the GSH1 ORF termination codon including N-terminal SpeI and C-terminal NcoI restriction enzyme sequences was obtained by performing PCR using the genomic DNA of the CJ-5 strain as a template and primers of SEQ ID NOS: 38 and 39 and treated with SpeI and NcoI restriction enzymes. Subsequently, the resultant was cloned into a pWBR100 treated with the same enzymes to prepare a pWBR100-GSH1 vector.

Before preparing a final DNA fragment to be introduced into the yeast, PCR products including the sequence encoding arginine mutation and a part of KlURA3 were obtained using the pWAL100-GSH1(C86R) vector prepared as described above as a template and the primers of SEQ ID NOS: 34 and 40, and PCR products including a part of KlURA3 and the 500 bp downstream from the GSH1 termination codon were obtained using the pWBR100-GSH1 vector as a template and the primers of SEQ ID NOS: 41 and 39. *S. cerevisiae* CEN.PK2-1D and *S. cerevisiae* CJ-5 were transformed with the PCR products in the same molar ratio. PCR was performed via denaturation at 95° C. for 5 minutes, annealing at 53° C. for 1 minute, and polymerization for 1 minute per kilogram at 72° C., and the transformation of the yeast was carried out according to a lithium acetate method modified from a method disclosed in a publication of Geitz (*Nucleic Acid Research*, 20(6), 1425). Specifically, yeast cells with an O.D. of 0.7 to 1.2 were washed with a lithium acetate/TE buffer twice and mixed with the PCR products and single-stranded DNA (Sigma D-7656). The mixture was cultured under a static culture condition in a lithium acetate/TE/40% PEG buffer at 30° C. for 30 minutes and at 42° C. for 15 minutes. Then, the cells were cultured in an SC (2% glucose) agar plate not including uracil until colonies were visible to obtain a strain into which the GSH1 C86R mutation-encoding sequence and the KlURA3 gene were introduced. Subsequently, in order to remove KlURA3, the strains were cultured in 2 mL YPD overnight, diluted at a ratio of 1/100, plated on an SC (2% glucose) agar plate including 0.1% 5-FOA to prepare *S. cerevisiae* CEN.PK2-1D GSH1 C86R mutant strain and *S. cerevisiae* CJ-5 GSH1 C86R mutant strain from which a uracil marker had been removed. Strains capable of expressing GSH1 variants in which cysteine was substituted with 18 types of amino acids other than arginine were also prepared in the same manner, except that a primer pair of SEQ ID NOS: 35 and 36 in which the sequence encoding the 86$^{th}$ arginine was substituted with a sequence encoding a different amino acid.

TABLE 1

| Primer | 5'→3' sequence |
|---|---|
| F_BamHI_GSH1 (SEQ ID NO: 34) | GGTAGGATCCATGGGACTCTTAGCTTTGGGCAC |
| R_GSH1_C86R (SEQ ID NO: 35) | TTAGCCTCCCTAAGGGACGAATCCT |
| F_GSH1_C86R (SEQ ID NO: 36) | CGTCCCTTAGGGAGGCTAACGATGT |
| R_XhoI_GSH1 (SEQ ID NO: 37) | ATGACTCGAGTTAACATTTGCTTTCTATTGAAGGC |
| F_SpeI_GSH1_DW (SEQ ID NO: 38) | TAGAACTAGTACTCCTTTTATTTCGGTTGTGAA |
| R_NcoI_GSH1_DW (SEQ ID NO: 39) | GCTGCCATGGGAATAGTGTGAACCGATAACTGTGT |
| R_AL killer (SEQ ID NO: 40) | GAGCAATGAACCCAATAACGAAATCTT |
| F_BR killer (SEQ ID NO: 41) | CTTGACGTTCGTTCGACTGATGAG |

After culturing the strains prepared as described above for 26 hours, concentration of produced glutathione (GSH) was measured and listed in Tables 2 and 3.

TABLE 2

| | *S. cerevisiae* CEN.PK2-1D | |
|---|---|---|
| Mutant | GSH concentration (mb/L) 26 hr | Increase (fold) |
| WT | 86.0 | 1.00 |
| F | 109.5 | 1.27 |
| H | 103.2 | 1.20 |
| K | 100.7 | 1.17 |
| E | 100.1 | 1.16 |
| G | 99.5 | 1.16 |
| D | 97.5 | 1.13 |
| N | 96.3 | 1.12 |
| R | 95.2 | 1.11 |
| Y | 94.6 | 1.10 |
| I | 93.0 | 1.08 |
| L | 92.2 | 1.07 |
| P | 92.0 | 1.07 |
| W | 90.8 | 1.06 |
| Q | 90.3 | 1.05 |
| S | 90.0 | 1.05 |
| M | 89.9 | 1.05 |
| T | 86.6 | 1.01 |
| A | 86.4 | 1.00 |
| V | 86.2 | 1.00 |

TABLE 3

S. cerevisiae CJ-5

| Mutant | GSH concentration (mb/L) 26 hr | Increase (fold) |
|---|---|---|
| WT | 271.3 | 1.00 |
| R | 330.0 | 1.22 |
| N | 321.9 | 1.19 |
| D | 318.4 | 1.17 |
| E | 314.4 | 1.16 |
| P | 304.2 | 1.12 |
| K | 302.4 | 1.11 |
| A | 294.9 | 1.09 |
| Q | 286.4 | 1.06 |
| V | 285.6 | 1.05 |
| F | 282.5 | 1.04 |
| Y | 277.5 | 1.02 |
| W | 276.0 | 1.02 |
| S | 274.5 | 1.01 |
| T | 273.9 | 1.01 |
| I | 273.5 | 1.01 |
| H | 272.1 | 1.00 |
| G | 272.0 | 1.00 |

As a result of the experiment, it was confirmed that the glutathione producing ability obtained by substituting cysteine at the $86^{th}$ position of the GSH1 protein with a different amino acid increased up to 27% compared to the glutathione producing ability obtained by the wild-type GSH1 protein.

Example 2-3: Induction of Additional Mutation to Enhance Glutathione Producing Ability and Identification of Modified Sequence Mutation was induced in the following manner in order to further enhance the glutathione producing ability of the CC02-2490 strain.

The CC02-2490 strain was cultured in a solid medium and inoculated into a broth to obtain a culture solution, and the culture solution was exposed to UV light using a UV lamp. After the culture solution exposed to UV light was plated on a plate medium, only a mutant strain that had formed colonies was isolated, and sequences of the GS1 coding region of and the upstream region thereof were analyzed in a strain having the most enhanced glutathione producing ability.

As a result, it was confirmed that variation occurred at positions −250 (C→T), −252 (G→A), −398 (A→T), −399 (A→C), −407 (T→C), and −409 (T→C) upstream from the GSH1 ORF sequence. The strain was named CC02-2544 strain and deposited at the Korean Culture Center of Microorganisms (KCCM) under the Budapest Treaty and deposited as Accession No. KCCM12674P on Feb. 20, 2020.

Example 2-4: Identification of Glutathione Producing Ability According to Mutation in GSH1 Promoter For comparison of glutathione producing ability in the presence or absence of mutation in the promoter, glutathione producing abilities of the CC02-2490 strain prepared in Example 2-1 and the CC02-2544 strain prepared in Example 2-3 were measured. Glutathione producing abilities of the wild-type CEN.PK1-D strain and the CJ-5 strain were measured as a control and shown in Table 4 below.

TABLE 4

| Strain | # | 10 hr $OD_{600}$ | 26 hr | | | 32 hr | | |
|---|---|---|---|---|---|---|---|---|
| | | | $OD_{600}$ | GSH (mg/L) | GSH content (%) | $OD_{600}$ | GSH (mg/L) | GSH content (%) |
| CEN.PK1-D | 1 | 37.2 | 51.4 | 84.4 | 0.8 | 50.6 | 96.1 | 0.9 |
| | 2 | 36.2 | 51.6 | 82.2 | 0.8 | 52.0 | 92.6 | 0.9 |
| | ave | 36.7 | 51.5 | 83.3 | 0.8 | 51.3 | 94.4 | 0.9 |
| CJ-5 | 1 | 30.2 | 47.8 | 266.4 | 2.7 | 56.8 | 267.1 | 2.3 |
| | 2 | 30.0 | 53.4 | 256.1 | 2.3 | 55.6 | 266.0 | 2.3 |
| | ave | 30.1 | 50.6 | 261.2 | 2.5 | 56.2 | 266.5 | 2.3 |
| CC02-2490 | 1 | 36.4 | 63.4 | 375.4 | 2.9 | 63.2 | 368.6 | 2.8 |
| | 2 | 37.4 | 64.8 | 379.8 | 2.8 | 61.6 | 379.2 | 3.0 |
| | ave | 36.9 | 64.1 | 377.6 | 2.9 | 62.4 | 373.9 | 2.9 |
| CC02-2544 | 1 | 37.8 | 66.2 | 477.7 | 3.5 | 64.4 | 482.0 | 3.6 |
| | 2 | 38.8 | 64.4 | 484.2 | 3.7 | 60.6 | 477.0 | 3.8 |
| | ave | 38.3 | 65.3 | 481.0 | 3.6 | 66.6 | 479.5 | 3.7 |

As a result of the experiment, it was confirmed that the production of glutathione by the 0002-2544 strain significantly increased by 508% compared to that by the wild-type CEN.PK1-D strain.

In addition, the production of glutathione by the 0002-2544 increased by 128% or more compared to the parent strain 0002-2490.

As a result, it was confirmed that the mutation of the promoter sequence of the GSH1 gene can lead to an increase in glutathione production.

Example 3: Experiment for Introducing Mutation into GSH1 Promoter of Strain

In order to identify effects of mutation in promoter on strains, promoter mutation confirmed in Example 2-3 was introduced into the wild-type strain, the CJ-5 strain, and the 0002-2490 strain prepared in Example 2-1, and glutathione producing abilities thereof were evaluated.

First, as a result of performing sequence alignment for introduction of mutation and identifying the GSH1 ORF upstream sequence (SEQ ID NO: 2) of the CJ-5 strain, it was confirmed that the CJ-5 strain had the same GSH1 promoter sequence as Saccharomyces cerevisiae strains CEN KSD-Yc, YJM1450, YJM1401, and YJM1307. However, when compared with the GSH1 ORF upstream sequence (SEQ ID NO: 1) of the wild-type strain (Saccharomyces cerevisiae CEN.PK1-D), it was confirmed that adenine was inserted at the $-74^{th}$ position of the promoter of the CJ-5 strain.

Based thereon, in the GSH1 ORF upstream sequence of Saccharomyces cerevisiae CEN.PK1-D, positions corresponding to the $-250^{th}$, $-252^{nd}$, $398^{th}399^{th}$, $-407^{th}$, and $-409^{th}$ positions of the GSH1 ORF upstream sequence of the CJ-5 strain were determined as the $-249^{th}$, $-251^{st}$, $-397^{th}$, $-398^{th}$, $-406^{th}$, and $-408^{th}$ positions by sequence alignment.

Subsequently, the above-described six types of mutation were introduced into the GSH1 ORF upstream regions of each of Saccharomyces cerevisiae strains CEN.PK1-D, CJ-5, and 0002-2490.

Specifically, in order to prepare strains in which the above-described six types of mutation were introduced into the GSH1 ORF upstream region, pWAL100 and pWBR100 plasmids were used with reference to a publication of Lee T H, et al. (J. Microbiol. Biotechnol. (2006), 16(6), 979-982).

After synthesizing a gene of a fragment including the GSH1 ORF upstream region including the six types of mutation and the GSH1 ORF region, PCR was performed using primers of SEQ ID NOS: 34 and 37 to thereby obtain a fragment of the GSH1 ORF upstream region including the N-terminal BamHI restriction enzyme sequence, the C-terminal XhoI restriction enzyme sequence, and the six types of mutation. Subsequently, pWAL100 and the fragment were treated with BamHI and XhoI, followed by ligation to prepare a plasmid.

Also, the 500 bp downstream from the GSH1 ORF termination codon including N-terminal SpeI and C-terminal NcoI restriction enzyme sequences was obtained by performing PCR using the genomic DNA of the CJ-5 strain as a template and primers of SEQ ID NOS: 38 and 39 and treated with SpeI and NcoI restriction enzymes. Subsequently, the resultant was ligated to a pWBR100 treated with the same enzymes to prepare a plasmid.

Before preparing a final DNA fragment to be introduced into the yeast, PCR products including the sequence including the GSH1 ORF upstream region including the six types of mutation, the GSH1 ORF region, and a part of KIURA3 were obtained using the pWAL plasmid prepared as described above as a template and the primers of SEQ ID NOS: 34 and 40, and PCR products including a part of KIURA3 and the 500 bp downstream from the GSH1 ORF termination codon were obtained using the pWBR plasmid as a template and the primers of SEQ ID NOS: 41 and 39. S. cerevisiae CEN.PK2-1D and S. cerevisiae CJ-5 and CC02-02490 strains were transformed with the PCR products in the same molar ratio. PCR was performed via denaturation at 95° C. for 5 minutes, annealing at 53° C. for 1 minute, and polymerization for 1 minute per kilogram at 72° C., and the transformation of the yeast was carried out according to a lithium acetate method modified from a method disclosed in a publication of Geitz (Nucleic Acid Research, 20(6), 1425). Specifically, yeast cells with an O.D. of 0.7 to 1.2 were washed with a lithium acetate/TE buffer twice. The DNA and single-stranded DNA (Sigma D-7656) are mixed, and the mixture was cultured under a static culture condition in a lithium acetate/TE/40% PEG buffer at 30° C. for 30 minutes and at 42° C. for 15 minutes. Then, the cells were cultured in an SC (2% glucose) agar plate not including uracil until colonies were visible to obtain strains in which the six types of mutation and the KIURA3 gene were introduced into the GSH1 ORF upstream region. Subsequently, in order to remove KIURA3, the strains were cultured in 2 mL YPD overnight, diluted in a ratio of 1/100, plated on an SC (2% glucose) agar plate including 0.1% 5-cA to prepare S. cerevisiae CEN.PK2-1D-derived mutant strains having six types of mutation in the GSH1 ORE upstream region and S. cerevisiae CJ-5-derived and 2-2490-derived mutant strains having six types of mutation in the GSH1 ORF upstream region.

GSH production of the strains is shown in Table 5 below.

TABLE 5

| Host | Mutation | # | 10 hr $OD_{600}$ | 26 hr | | | 32 hr | | |
|------|----------|---|------------------|-------|---|---|-------|---|---|
| | | | | $OD_{600}$ | GSH (mg/L) | GSH content (%) | $OD_{600}$ | GSH (mg/L) | GSH content (%) |
| CEN.PK1-D | control | 1 | 37.2 | 51.4 | 84.4 | 0.8 | 50.6 | 96.1 | 0.9 |
| | | 2 | 36.2 | 51.6 | 82.2 | 0.8 | 52.0 | 92.6 | 0.9 |
| | | ave | 36.7 | 51.5 | 83.3 | 0.8 | 51.3 | 94.4 | 0.9 |
| | GSH1 promoter, mutation at 6 points | 1 | 36.6 | 49.2 | 110.3 | 1.1 | 51.8 | 131.0 | 1.2 |
| | | 2 | 36.4 | 52.0 | 114.6 | 1.1 | 52.8 | 135.6 | 1.2 |
| | | ave | 36.5 | 50.6 | 112.4 | 1.1 | 52.3 | 133.3 | 1.2 |
| CJ-5 | control | 1 | 30.2 | 47.8 | 266.4 | 2.7 | 56.8 | 267.1 | 2.3 |
| | | 2 | 30.0 | 53.4 | 256.1 | 2.3 | 55.6 | 266.0 | 2.3 |
| | | ave | 30.1 | 50.6 | 261.2 | 2.5 | 56.2 | 266.5 | 2.3 |
| | GSH1 promoter, mutation at 6 points | 1 | 30.2 | 53.0 | 332.8 | 3.0 | 54.2 | 325.5 | 2.9 |
| | | 2 | 29.2 | 54.2 | 360.9 | 3.2 | 58.8 | 354.6 | 2.9 |
| | | ave | 29.7 | 53.6 | 346.9 | 3.1 | 56.5 | 340.1 | 2.9 |
| CC02-2490 | control | 1 | 36.4 | 63.4 | 375.4 | 2.9 | 63.2 | 368.6 | 2.8 |
| | | 2 | 37.4 | 64.8 | 379.8 | 2.8 | 61.6 | 379.2 | 3.0 |
| | | ave | 36.9 | 64.1 | 377.6 | 2.9 | 62.4 | 373.9 | 2.9 |
| | GSH1 promoter, mutation at 6 points | 1 | 36.5 | 65.8 | 468.9 | 3.4 | 63.1 | 472.6 | 3.6 |
| | | 2 | 37.6 | 66.2 | 475.0 | 3.4 | 63.6 | 471.8 | 3.5 |
| | | ave | 37.1 | 66.0 | 472.0 | 3.4 | 63.35 | 472.2 | 3.6 |

As a result of the experiment, it was confirmed that the glutathione production increased up to 141% in the same strain according to mutation in the promoter.

As a result, it was confirmed that the mutation of the promoter sequence of the GSH1 gene can lead to an increase in glutathione production.

Example 4: Experiment for Introducing Mutation into GSH1 Promoter (1)

Based on the results confirmed in the above-described examples, an experiment was performed to identify whether the glutathione producing ability is enhanced by introducing mutation into only some of the positions.

Specifically, mutation was introduced into two points at the $-250^{th}$ and $-252^{nd}$ positions upstream from the GSH1 ORF ($-250$ (C→T) and $-252$ (G→A)) and four points at the $-398^{th}$, $-399^{th}$, $-407^{th}$, and $-409^{th}$ positions ($-398$ (A→T), $-399$ (A→C), $-407$ (T→C), and $-409$ (T→C)) in the CEN.PK1-D, CJ-5, and CC02-2490 strains, respectively. (In the case of CEN.PK1-D, mutation was introduced into the $-249^{th}$, $-251^{st}$, $-397^{th}$, $-398^{th}$, $-406^{th}$, and $-408^{th}$ positions corresponding thereto, which will be applied to the following description). Strains were prepared in the same manner as in Example 3, except that a gene of a fragment including the GSH1 ORF upstream region including mutation at two points or four points and the GSH1 ORF region was synthesized, and then PCR was performed using primers of SEQ ID NOS: 34 and 37 to thereby obtain a fragment of the GSH1 ORF upstream region including the N-terminal BamHI restriction enzyme sequence, the C-terminal XhoI restriction enzyme sequence, and the mutation at two points or four points.

The results of the experiment are shown in Tables 6 to 8.

TABLE 6

| Host | Mutation | # | 10 hr $OD_{600}$ | 26 hr | | | 32 hr | | |
|---|---|---|---|---|---|---|---|---|---|
| | | | | $OD_{600}$ | GSH (mg/L) | GSH content (%) | $OD_{600}$ | GSH (mg/L) | GSH content (%) |
| CEN.PK1-D | control | 1 | 37.2 | 51.4 | 84.4 | 0.8 | 50.6 | 96.1 | 0.9 |
| | | 2 | 36.2 | 51.6 | 82.2 | 0.8 | 52.0 | 92.6 | 0.9 |
| | | ave | 36.7 | 51.5 | 83.3 | 0.8 | 51.3 | 94.4 | 0.9 |
| | GSH1 promoter, mutation at two points | 1 | 37.2 | 50.6 | 109.8 | 1.1 | 53.6 | 132.0 | 1.2 |
| | | 2 | 38.8 | 48.0 | 106.9 | 1.1 | 54.8 | 122.0 | 1.1 |
| | | ave | 38.0 | 49.3 | 108.3 | 1.1 | 54.2 | 127.0 | 1.1 |
| | GSH1 promoter, mutation at four points | 1 | 37.2 | 51.4 | 100.6 | 0.9 | 54.2 | 105.3 | 0.9 |
| | | 2 | 37.0 | 50.8 | 102.1 | 1.0 | 53.2 | 105.4 | 1.0 |
| | | ave | 37.1 | 51.1 | 101.3 | 1.0 | 53.7 | 105.3 | 1.0 |
| | GSH1 promoter, mutation at 6 points | 1 | 36.6 | 49.2 | 110.3 | 1.1 | 51.8 | 131.0 | 1.2 |
| | | 2 | 36.4 | 52.0 | 114.6 | 1.1 | 52.8 | 135.6 | 1.2 |
| | | ave | 36.5 | 50.6 | 112.4 | 1.1 | 52.3 | 133.3 | 1.2 |

TABLE 7

| Host | Mutation | # | 10 hr $OD_{600}$ | 26 hr | | | 32 hr | | |
|---|---|---|---|---|---|---|---|---|---|
| | | | | $OD_{600}$ | GSH (mg/L) | GSH content (%) | $OD_{600}$ | GSH (mg/L) | GSH content (%) |
| CJ-5 | control | 1 | 30.2 | 47.8 | 266.4 | 2.7 | 56.8 | 267.1 | 2.3 |
| | | 2 | 30.0 | 53.4 | 256.1 | 2.3 | 55.6 | 266.0 | 2.3 |
| | | ave | 30.1 | 50.6 | 261.2 | 2.5 | 56.2 | 266.5 | 2.3 |
| | GSH1 promoter, mutation at two points | 1 | 30.2 | 53.8 | 297.6 | 2.7 | 54.4 | 298.8 | 2.7 |
| | | 2 | 30.4 | 57.6 | 299.0 | 2.5 | 53.0 | 292.4 | 2.7 |
| | | ave | 30.3 | 55.7 | 298.3 | 2.6 | 53.7 | 295.6 | 2.7 |
| | GSH1 promoter, mutation at four points | 1 | 31.2 | 52.4 | 328.8 | 3.0 | 57.2 | 326.6 | 2.8 |
| | | 2 | 40.6 | 57.8 | 345.8 | 2.9 | 66.0 | 344.9 | 2.5 |
| | | ave | 35.9 | 55.1 | 337.3 | 3.0 | 61.6 | 335.7 | 2.7 |
| | GSH1 promoter, mutation at 6 points | 1 | 30.2 | 53.0 | 332.8 | 3.0 | 54.2 | 325.5 | 2.9 |
| | | 2 | 29.2 | 54.2 | 360.9 | 3.2 | 58.8 | 354.6 | 2.9 |
| | | ave | 29.7 | 53.6 | 346.9 | 3.1 | 56.5 | 340.1 | 2.9 |

TABLE 8

| Host | Mutation | # | 10 hr OD$_{600}$ | 26 hr | | | 32 hr | | |
|---|---|---|---|---|---|---|---|---|---|
| | | | | OD$_{600}$ | GSH (mg/L) | GSH content (%) | OD$_{600}$ | GSH (mg/L) | GSH content (%) |
| CC02-2490 | control | 1 | 36.4 | 63.4 | 375.4 | 2.9 | 63.2 | 368.6 | 2.8 |
| | | 2 | 37.4 | 64.8 | 379.8 | 2.8 | 61.6 | 379.2 | 3.0 |
| | | ave | 36.9 | 64.1 | 377.6 | 2.9 | 62.4 | 373.9 | 2.9 |
| | GSH1 promoter, mutation at two points | 1 | 37.0 | 64.8 | 415.0 | 3.1 | 66.6 | 419.5 | 3.1 |
| | | 2 | 37.6 | 65.4 | 452.4 | 3.4 | 64.6 | 445.7 | 3.3 |
| | | ave | 37.3 | 65.1 | 433.7 | 3.2 | 65.6 | 432.6 | 3.2 |
| | GSH1 promoter, mutation at four points | 1 | 37.8 | 65.4 | 455.4 | 3.4 | 59.6 | 452.1 | 3.7 |
| | | 2 | 37.6 | 65.8 | 459.8 | 3.4 | 63.4 | 455.1 | 3.5 |
| | | ave | 37.7 | 65.6 | 457.6 | 3.4 | 66.6 | 453.6 | 3.6 |
| | GSH1 promoter, mutation at 6 points | 1 | 36.5 | 65.8 | 468.9 | 3.4 | 63.1 | 472.6 | 3.6 |
| | | 2 | 37.6 | 66.2 | 475.0 | 3.4 | 63.6 | 471.8 | 3.5 |
| | | ave | 37.1 | 66.0 | 472.0 | 3.4 | 63.35 | 472.2 | 3.6 |

As a result of the experiment, it was confirmed that the glutathione producing ability was enhanced by introducing mutation at two points (−250 (C→T) and −252 (G→A)) or at four points (−398 (A→T), −399 (A→C), −407 (T→C), and −409 (T→C)) when compared to the strains with no mutation in the promoter region, and the glutathione production increased up to 135%.

Based thereon, it may be confirmed that the glutathione producing ability is significantly enhanced by mutation introduced into only some of the positions of the promoter developed in the present disclosure as well as all of the six positions initially confirmed.

Example 5: Experiment for Introducing Mutation into GSH1 Promoter (2)

Based on the results confirmed in the above-described examples, an experiment was performed to identify whether the glutathione producing ability is enhanced by introducing mutation into only some of the positions. Specifically, mutation was introduced into one point at the −250$^{th}$ position (C→T) (mutation at one point (1)) or at the −252$^{nd}$ position (G→A) (mutation at one point (2)) and two points at both positions in the CEN.PK1-D and CJ-5 strains, and glutathione producing abilities thereof were measured and shown in Tables 9 and 10.

To this end, strains were prepared in the same manner as in Example 3, except that a gene of a fragment including the GSH1 ORF upstream region including mutation at one point or two points and the GSH1 ORF region was synthesized, and then PCR was performed using primers of SEQ ID NOS: 34 and 37 to thereby obtain a fragment of the GSH1 ORF upstream region including the N-terminal BamHI restriction enzyme sequence, the C-terminal XhoI restriction enzyme sequence, and the mutation at one point or two points.

TABLE 9

| Host | Mutation | # | 10 hr OD$_{600}$ | 26 hr | | | 32 hr | | |
|---|---|---|---|---|---|---|---|---|---|
| | | | | OD$_{600}$ | GSH (mg/L) | GSH content (%) | OD$_{600}$ | GSH (mg/L) | GSH content (%) |
| CJ-5 | control | 1 | 30.2 | 47.8 | 266.4 | 2.7 | 56.8 | 267.1 | 2.3 |
| | | 2 | 30.0 | 53.4 | 256.1 | 2.3 | 55.6 | 266.0 | 2.3 |
| | | ave | 30.1 | 50.6 | 261.2 | 2.5 | 56.2 | 266.5 | 2.3 |
| | GSH1 promoter, mutation at one point(1) | 1 | 30.8 | 53.2 | 253.9 | 2.3 | 53.2 | 268.9 | 2.5 |
| | | 2 | 30.8 | 53.0 | 257.0 | 2.4 | 53.6 | 269.6 | 2.4 |
| | | ave | 30.8 | 53.1 | 255.4 | 2.3 | 53.4 | 269.3 | 2.4 |
| | GSH1 promoter, mutation at one point(2) | 1 | 28.8 | 52.2 | 253.9 | 2.4 | 53.2 | 268.9 | 2.5 |
| | | 2 | 29.8 | 51.0 | 257.0 | 2.4 | 53.6 | 269.6 | 2.4 |
| | | ave | 29.3 | 51.6 | 255.4 | 2.4 | 53.4 | 269.3 | 2.4 |
| | GSH1 promoter, mutation at two points | 1 | 30.2 | 53.8 | 297.6 | 2.7 | 54.4 | 298.8 | 2.7 |
| | | 2 | 30.4 | 57.6 | 299.0 | 2.5 | 53.0 | 292.4 | 2.7 |
| | | ave | 30.3 | 55.7 | 298.3 | 2.6 | 53.7 | 295.6 | 2.7 |

TABLE 10

| Host | Mutation | # | 10 hr OD$_{600}$ | 26 hr OD$_{600}$ | 26 hr GSH (mg/L) | 26 hr GSH content (%) | 32 hr OD$_{600}$ | 32 hr GSH (mg/L) | 32 hr GSH content (%) |
|---|---|---|---|---|---|---|---|---|---|
| CEN.PK1-D | control | 1 | 37.2 | 51.4 | 84.4 | 0.8 | 50.6 | 96.1 | 0.9 |
| | | 2 | 36.2 | 51.6 | 82.2 | 0.8 | 52.0 | 92.6 | 0.9 |
| | | ave | 36.7 | 51.5 | 83.3 | 0.8 | 51.3 | 94.4 | 0.9 |
| | GSH1 promoter, mutation at one point(1) | 1 | 37.5 | 53.8 | 85.0 | 0.8 | 52.2 | 99.2 | 0.9 |
| | | 2 | 36.8 | 53.7 | 94.5 | 0.9 | 54.1 | 95.5 | 0.9 |
| | | ave | 37.2 | 53.8 | 89.7 | 0.8 | 53.2 | 97.3 | 0.9 |
| | GSH1 promoter, mutation at one point(2) | 1 | 37.8 | 58.8 | 95.0 | 0.8 | 53.2 | 91.0 | 0.8 |
| | | 2 | 37.2 | 57.2 | 90.5 | 0.8 | 50.8 | 105.5 | 1.0 |
| | | ave | 37.5 | 58.0 | 92.7 | 0.8 | 52.0 | 98.2 | 0.9 |
| | GSH1 promoter, mutation at two points | 1 | 37.2 | 50.6 | 109.8 | 1.1 | 53.6 | 132.0 | 1.2 |
| | | 2 | 38.8 | 48.0 | 106.9 | 1.1 | 54.8 | 122.0 | 1.1 |
| | | ave | 38.0 | 49.3 | 108.3 | 1.1 | 54.2 | 127.0 | 1.1 |

As a result of the experiment, it was confirmed that the glutathione producing ability was enhanced by introducing mutation into only some points.

Based thereon, it may be confirmed that the glutathione producing ability is significantly enhanced by mutation introduced into only some of the positions of the promoter developed in the present disclosure as well as all of the six positions initially confirmed.

Example 6: Experiment for Introducing Mutation into GSH1 Promoter (3)

Based on the results confirmed in the above-described examples, an experiment was performed to identify whether the glutathione producing ability is enhanced by introducing mutation into only some of the positions.

Specifically, mutation was introduced four points at the −398$^{th}$, −399$^{th}$, −407$^{th}$, and −409$^{th}$ positions (−398 (A→T), −399 (A→C), −407 (T→C), and −409 (T→C)) independently or in combination.

The mutations are as follows.

1) mutation at one point (1): GSH1 −398 (A→T)
2) mutation at one point (2): GSH1 −399 (A→C)
3) mutation at one point (3): GSH1 −407 (T→C)
4) mutation at one point (4): GSH1 −409 (T→C)
5) mutation at two points (1): GSH1 −398 (A→T) and −399 (A→C)
6) mutation at two points (2): GSH1 −398 (A→T) and −407 (T→C)
7) mutation at two points (3): GSH1 −398 (A→T) and −409 (T→C)
8) mutation at two points (4): GSH1 −399 (A→C) and −407 (T→C)
9) mutation at two points (5): GSH1 −399 (A→C) and −409 (T→C)
10) mutation at two points (6): GSH1 −407 (T→C) and −409 (T→C)
11) mutation at four points: GSH1 −398 (A→T), −399 (A→C), −407 (T→C), and −409 (T→C)

To this end, strains were prepared in the same manner as in Example 3, except that a gene of a fragment including the GSH1 ORF upstream region including mutation at one point, two points, or four points and the GSH1 ORF region was synthesized, and then PCR was performed using primers of SEQ ID NOS: 34 and 37 to thereby obtain a fragment of the GSH1 ORF upstream region including the N-terminal BamHI restriction enzyme sequence, the C-terminal XhoI restriction enzyme sequence, and the mutation at one point, two points, or four points.

Glutathione producing abilities of the strains were identified, and the results are shown in Tables 11 and 12 below.

TABLE 11

| Host | Mutation | # | 10 hr OD600 | 26 hr OD600 | 26 hr GSH (mg/L) | 26 hr GSH content (%) | 32 hr OD600 | 32 hr GSH (mg/L) | 32 hr GSH content (%) |
|---|---|---|---|---|---|---|---|---|---|
| CJ-5 | control | 1 | 30.2 | 47.8 | 266.4 | 2.7 | 56.8 | 267.1 | 2.3 |
| | | 2 | 30.0 | 53.4 | 256.1 | 2.3 | 55.6 | 266.0 | 2.3 |
| | | ave | 30.1 | 50.6 | 261.2 | 2.5 | 56.2 | 266.5 | 2.3 |
| | GSH1 promoter, mutation at one point (1) | 1 | 27.6 | 52.0 | 267.2 | 2.5 | 54.4 | 267.6 | 2.4 |
| | | 2 | 27.4 | 52.4 | 251.3 | 2.3 | 53.4 | 261.8 | 2.4 |
| | | ave | 27.5 | 52.2 | 259.3 | 2.4 | 53.9 | 264.7 | 2.4 |
| | GSH1 promoter, mutation at one point (2) | 1 | 30.0 | 54.8 | 268.8 | 2.4 | 56.0 | 284.3 | 2.5 |
| | | 2 | 27.8 | 55.4 | 259.0 | 2.3 | 56.2 | 272.7 | 2.4 |
| | | ave | 28.9 | 55.1 | 263.9 | 2.3 | 56.1 | 278.5 | 2.4 |
| | GSH1 promoter, mutation at one point (3) | 1 | 27.0 | 52.4 | 270.2 | 2.5 | 52.6 | 268.2 | 2.5 |
| | | 2 | 24.4 | 50.0 | 263.9 | 2.6 | 54.8 | 256.2 | 2.3 |
| | | ave | 25.7 | 51.2 | 267.1 | 2.5 | 53.7 | 262.2 | 2.4 |

TABLE 11-continued

| Host | Mutation | # | 10 hr OD600 | 26 hr OD600 | 26 hr GSH (mg/L) | 26 hr GSH content (%) | 32 hr OD600 | 32 hr GSH (mg/L) | 32 hr GSH content (%) |
|---|---|---|---|---|---|---|---|---|---|
| | GSH1 promoter, mutation at one point (4) | 1 | 36.0 | 60.2 | 267.7 | 2.2 | 59.6 | 268.9 | 2.2 |
| | | 2 | 28.8 | 53.6 | 263.2 | 2.4 | 54.8 | 266.5 | 2.4 |
| | | ave | 32.4 | 56.9 | 265.5 | 2.3 | 57.2 | 267.7 | 2.3 |
| | GSH1 promoter, mutation at two points (1) | 1 | 39.8 | 55.4 | 301.8 | 2.6 | 58.6 | 327.8 | 2.7 |
| | | 2 | 30.0 | 55.0 | 305.0 | 2.7 | 54.2 | 304.0 | 2.7 |
| | | ave | 34.9 | 55.2 | 303.4 | 2.7 | 56.4 | 315.9 | 2.7 |
| | GSH1 promoter, mutation at two points (2) | 1 | 27.8 | 55.4 | 266.4 | 2.3 | 54.2 | 268.4 | 2.4 |
| | | 2 | 28.8 | 56.8 | 269.9 | 2.3 | 55.0 | 272.2 | 2.4 |
| | | ave | 28.3 | 56.1 | 268.2 | 2.3 | 54.6 | 270.3 | 2.4 |
| | GSH1 promoter, mutation at two points (3) | 1 | 29.0 | 54.8 | 275.7 | 2.4 | 57.4 | 274.4 | 2.3 |
| | | 2 | 29 | 52.0 | 268.0 | 2.5 | 54.4 | 269.1 | 2.4 |
| | | ave | 29.0 | 53.4 | 271.9 | 2.5 | 55.9 | 271.8 | 2.4 |
| | GSH1 promoter, mutation at two points (4) | 1 | 30.0 | 53.4 | 284.7 | 2.6 | 55.2 | 285.2 | 2.5 |
| | | 2 | 26.8 | 52.8 | 263.6 | 2.4 | 54.4 | 269.4 | 2.4 |
| | | ave | 28.4 | 53.1 | 274.2 | 2.5 | 54.8 | 277.3 | 2.5 |
| | GSH1 promoter, mutation at two points (5) | 1 | 29.0 | 50.0 | 274.5 | 2.7 | 52.4 | 276.9 | 2.6 |
| | | 2 | 29.8 | S4.2 | 271.4 | 2.4 | 55.4 | 276.7 | 2.4 |
| | | ave | 29.4 | 52.1 | 272.9 | 2.5 | 53.9 | 276.8 | 2.5 |
| | GSH1 promoter, mutation at two points (6) | 1 | 30.2 | 52.0 | 309.9 | 2.9 | 54.4 | 308.1 | 2.7 |
| | | 2 | 29.6 | 56.2 | 300.2 | 2.6 | 53.8 | 306.9 | 2.8 |
| | | ave | 29.9 | 54.1 | 305.1 | 2.7 | 54.1 | 307.5 | 2.8 |
| | GSH1 promoter, mutation at four points | 1 | 31.2 | 52.4 | 328.8 | 3.0 | 57.2 | 326.6 | 2.8 |
| | | 2 | 40.6 | 57.8 | 345.8 | 2.9 | 66.0 | 344.9 | 2.5 |
| | | ave | 35.9 | 55.1 | 337.3 | 3.0 | 61.6 | 335.7 | 2.7 |

TABLE 12

| Host | Mutation | # | 10 hr OD600 | 26 hr OD600 | 26 hr GSH (mg/L) | 26 hr GSH content (%) | 32 hr OD600 | 32 hr GSH (mg/L) | 32 hr GSH content (%) |
|---|---|---|---|---|---|---|---|---|---|
| CEN.PK1D | control | 1 | 37.2 | 51.4 | 84.4 | 0.8 | 50.6 | 96.1 | 0.9 |
| | | 2 | 36.2 | 51.6 | 82.2 | 0.8 | 52.0 | 92.6 | 0.9 |
| | | ave | 36.7 | 51.5 | 83.3 | 0.8 | 51.3 | 94.4 | 0.9 |
| | GSH1 promoter, mutation at one point (1) | 1 | 40.6 | 55.6 | 89.2 | 0.8 | 55.8 | 90.2 | 0.8 |
| | | 2 | 40.6 | 56.0 | 87.5 | 0.8 | 58.6 | 92.5 | 0.8 |
| | | ave | 40.6 | 55.8 | 88.3 | 0.8 | 57.2 | 91.3 | 0.8 |
| | GSH1 promoter, mutation at one point (2) | 1 | 41.2 | 58.4 | 91.4 | 0.8 | 57.6 | 93.4 | 0.8 |
| | | 2 | 41.2 | 55.2 | 91.3 | 0.8 | 53.6 | 94.3 | 0.9 |
| | | ave | 41.2 | 56.8 | 91.3 | 0.8 | 55.6 | 93.8 | 0.8 |
| | GSH1 promoter, mutation at one point (3) | 1 | 39.8 | 54.4 | 90.0 | 0.8 | 58.4 | 92.0 | 0.8 |
| | | 2 | 41.0 | 54.4 | 89.9 | 0.8 | 59.0 | 90.9 | 0.7 |
| | | ave | 40.4 | 54.4 | 90.0 | 0.8 | 58.7 | 91.5 | 0.8 |
| | GSH1 promoter, mutation at one point (4) | 1 | 42.0 | 57.8 | 89.1 | 0.7 | 56.8 | 92.1 | 0.8 |
| | | 2 | 41.2 | 57.8 | 89.4 | 0.8 | 56.4 | 92.4 | 0.8 |
| | | ave | 41.6 | 57.8 | 89.3 | 0.7 | 56.6 | 92.3 | 0.8 |
| | GSH1 promoter, mutation at two points (1) | 1 | 36.4 | 49.8 | 99.8 | 1.0 | 51.4 | 104.5 | 1.0 |
| | | 2 | 36.0 | 47.0 | 97.9 | 1.0 | 52.4 | 109.2 | 1.0 |
| | | ave | 36.2 | 48.4 | 98.9 | 1.0 | 51.9 | 106.9 | 1.0 |
| | GSH1 promoter, mutation at two points (2) | 1 | 40.2 | 55.2 | 88.0 | 0.8 | 53.2 | 92.0 | 0.8 |
| | | 2 | 40.8 | 54.2 | 93.2 | 0.8 | 59.4 | 95.2 | 0.8 |
| | | ave | 40.5 | 54.7 | 90.6 | 0.8 | 56.3 | 93.6 | 0.3 |
| | GSH1 promoter, | 1 | 39.4 | 53.8 | 93.1 | 0.8 | 54.6 | 96.1 | 0.9 |
| | | 2 | 40.2 | 55.2 | 89.3 | 0.8 | 57.0 | 90.3 | 0.8 |

TABLE 12-continued

| Host | Mutation | # | 10 hr OD600 | 26 hr | | | 32 hr | | |
|---|---|---|---|---|---|---|---|---|---|
| | | | | OD600 | GSH (mg/L) | GSH content (%) | OD600 | GSH (mg/L) | GSH content (%) |
| | mutation at two points (3) | ave | 39.8 | 54.5 | 91.2 | 0.8 | 55.8 | 93.2 | 0.8 |
| | GSH1 promoter, mutation at two points (4) | 1 | 36.2 | 48.0 | 85.5 | 0.9 | 51.8 | 90.1 | 0.8 |
| | | 2 | 35.2 | 45.6 | 84.3 | 0.9 | 52.4 | 89.9 | 0.8 |
| | | ave | 35.7 | 46.8 | 84.9 | 0.9 | 52.1 | 90.0 | 0.8 |
| | GSH1 promoter, mutation at two points (5) | 1 | 42.2 | 55.2 | 90.7 | 0.8 | 60.8 | 92.7 | 0.7 |
| | | 2 | 42.4 | 57.8 | 90.9 | 0.8 | 56.6 | 93.9 | 0.8 |
| | | ave | 42.3 | 56.5 | 90.8 | 0.8 | 58.7 | 93.3 | 0.8 |
| | GSH1 promoter, mutation at two points (6) | 1 | 40.6 | 52.4 | 99.1 | 0.9 | 57.6 | 102.1 | 0.9 |
| | | 2 | 41.0 | 53.0 | 98.6 | 0.9 | 59.4 | 100.6 | 0.8 |
| | | ave | 40.8 | 52.7 | 98.9 | 0.9 | 58.5 | 101.4 | 0.8 |
| | GSH1 promoter, mutation at four points | 1 | 37.2 | 51.4 | 100.6 | 0.9 | 54.2 | 105.3 | 0.9 |
| | | 2 | 37.0 | 50.8 | 102.1 | 1.0 | 53.2 | 105.4 | 1.0 |
| | | ave | 37.1 | 51.1 | 101.3 | 1.0 | 53.7 | 105.3 | 1.0 |

As a result of the experiment, it was confirmed that the glutathione producing ability was enhanced by introducing mutation into only some of the four points compared to the strains with no mutation in the promoter region as well as the case where mutation was introduced into all of the four points. In particular, in the cases of 5) mutation at two points (1): GSH1 −398 (A→T) and −399 (A→C) and 10) mutation at two points (6): GSH1 −407 (T→C) and −409 (T→C), glutathione producing ability was significantly enhanced when compared to the strains with no mutation in the promoter region.

Based thereon, it may be confirmed that the glutathione producing ability is significantly enhanced by mutation introduced into only some of the positions of the promoter developed in the present disclosure as well as all of the six positions initially confirmed.

The above description of the present disclosure is provided for the purpose of illustration, and it would be understood by those skilled in the art that various changes and modifications may be made without changing the technical conception and essential features of the present disclosure. Thus, it is clear that the above-described embodiments are illustrative in all aspects and do not limit the present disclosure. The various embodiments disclosed herein are not intended to be limiting, with the true scope and spirit being indicated by the following claims. The present disclosure is to be limited only by the terms of the appended claims, along with the full scope of equivalents to which such claims are entitled.

The invention claimed is:

1. A polynucleotide having promoter activity, wherein at least one nucleotide selected from the group consisting of the $92^{nd}$, $94^{th}$, $102^{nd}$, $103^{rd}$, $249^{th}$ and $251^{st}$ nucleotides of the polynucleotide sequence of SEQ ID NO: 1 or 2 is substituted with a different nucleotide.

2. The polynucleotide of claim 1, wherein the $249^{th}$ and $251^{st}$ nucleotides of the polynucleotide having promoter activity are substituted with different nucleotides.

3. The polynucleotide of claim 1, wherein the $92^{nd}$, $94^{th}$, $102^{nd}$, and $103^{rd}$ nucleotides of the polynucleotide having promoter activity are substituted with different nucleotides.

4. The polynucleotide of claim 1, wherein the $92^{nd}$, $94^{th}$, $102^{nd}$, $103^{rd}$, $249^{th}$ and $251^{st}$ nucleotides of the polynucleotide having promoter activity are substituted with different nucleotides.

5. The polynucleotide of claim 1, wherein the polynucleotide having promoter activity consists of one polynucleotide sequence selected from the group consisting of SEQ ID NOS: 3 to 32.

6. A vector comprising the polynucleotide of claim 1 and a gene encoding a target protein.

7. The vector of claim 6, wherein the target protein has glutamate-cysteine ligase activity.

8. A microorganism belonging to the genus *Saccharomyces* sp. comprising the polynucleotide of claim 1, a polynucleotide comprising the polynucleotide and a gene encoding a target protein, or a vector including the same.

9. The microorganism of claim 8, wherein the target protein is a polypeptide having glutamate-cysteine ligase activity.

10. A method of producing glutathione comprising culturing the microorganism of claim 9 in a culture medium.

11. The method of claim 10, further comprising recovering glutathione from at least one selected from the group consisting of the cultured microorganism, a dried form of the microorganism, an extract of the microorganism, a culture product of the microorganism, and a lysate of the microorganism.

* * * * *